United States Patent [19]
Kori et al.

[11] Patent Number: 5,513,010
[45] Date of Patent: Apr. 30, 1996

[54] DIGITAL VIDEO SIGNAL RECORDING AND REPRODUCING APPARATUS THAT RECORDS AND REPRODUCES BOTH STILL AND MOVING PICTURES

[75] Inventors: Teruhiko Kori; Ken Iizuka, both of Kanagawa; Masaki Oguro, Tokyo, all of Japan

[73] Assignee: Sony Corporation, Tokyo, Japan

[21] Appl. No.: 291,540

[22] Filed: Aug. 16, 1994

[30] Foreign Application Priority Data

Aug. 16, 1993 [JP] Japan .................................... 5-222843

[51] Int. Cl.⁶ .................................................. H04N 5/78
[52] U.S. Cl. ........................ 358/341; 358/335; 360/35.1; 360/48; 360/32
[58] Field of Search ........................ 358/341, 342, 358/343; 360/35.1, 48, 33.1, 32, 19.1; H04N 5/76, 5/92, 5/78, 5/782, 5/781, 5/783

[56] References Cited

U.S. PATENT DOCUMENTS

| | | | |
|---|---|---|---|
| 5,010,417 | 4/1991 | Yoshio et al. | 358/335 |
| 5,130,860 | 7/1992 | Nagashima et al. | 360/19.1 |
| 5,140,437 | 8/1992 | Yonemitsu et al. | 358/342 |
| 5,315,401 | 5/1994 | Okada et al. | 358/337 |
| 5,412,514 | 5/1995 | Kobayashi | 360/35.1 |

Primary Examiner—Tommy P. Chin
Assistant Examiner—David R. Vincent
Attorney, Agent, or Firm—William S. Frommer; Alvin Sinderbrand

[57] ABSTRACT

A video tape recording and reproducing apparatus records and reproduces digital video signals representing both still pictures, and moving pictures in the form of coded signals that have a recording format which includes a video signal recording area for recording video data and its respective accompanying video information, and a subcode information area. The recording and reproducing apparatus generates signals for high speed cuing and reproduction of the still pictures and moving pictures and stores the signals in the accompanying video information and in the subcode area.

29 Claims, 38 Drawing Sheets

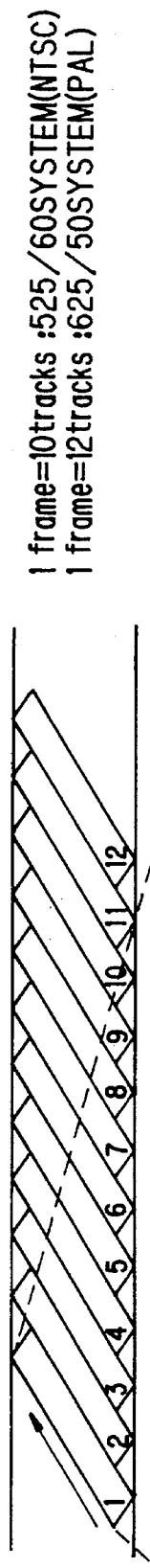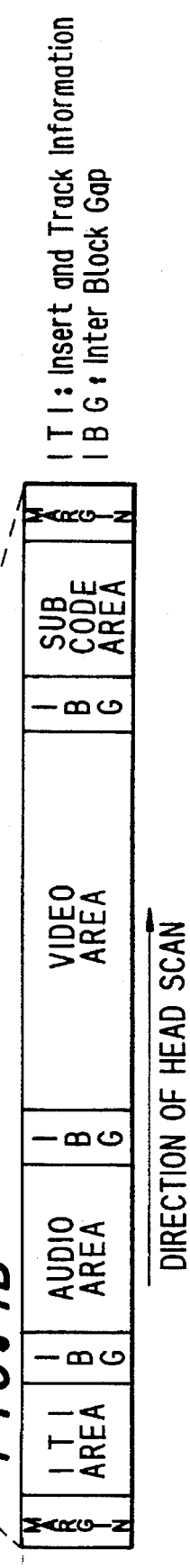

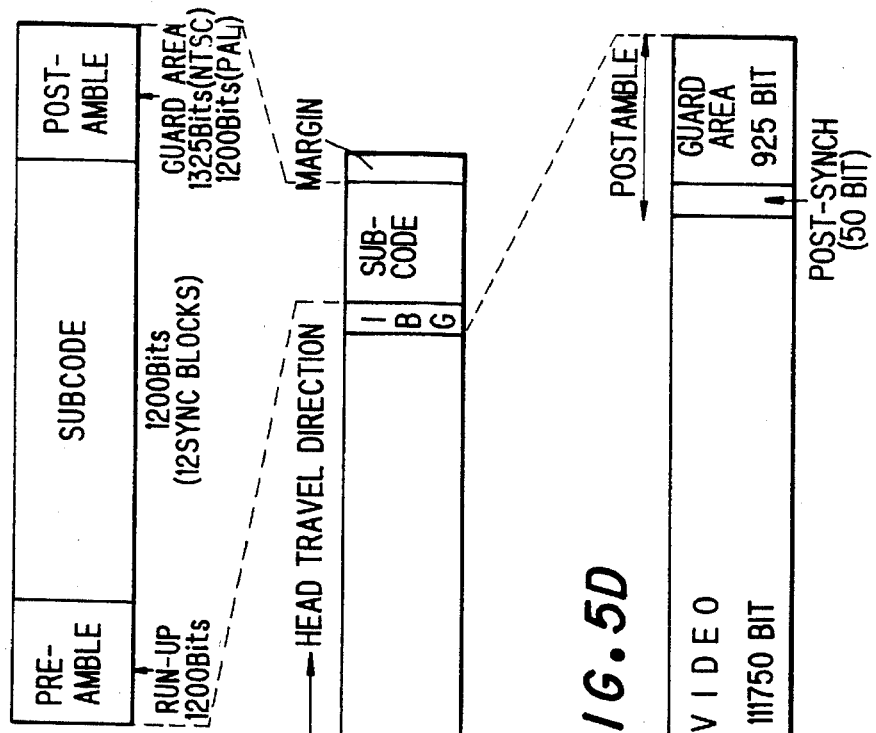
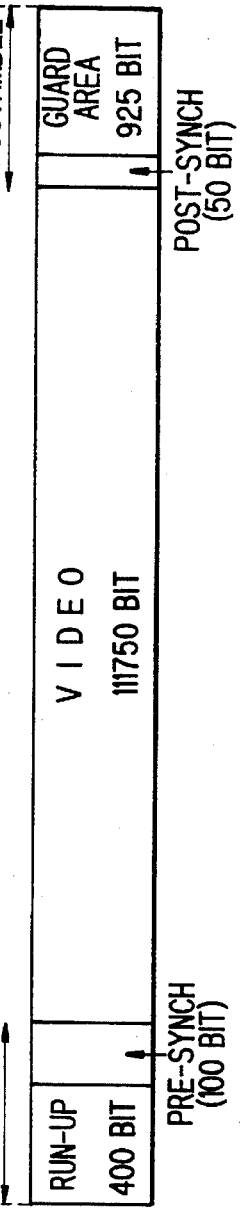
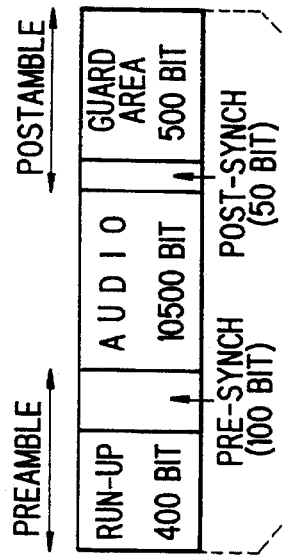
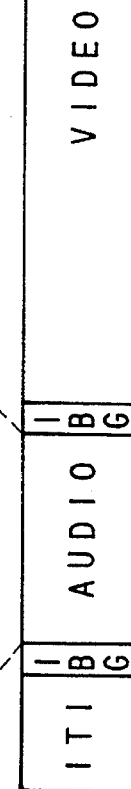
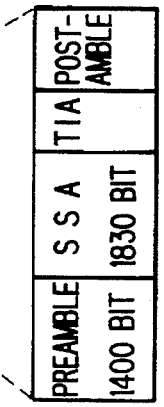

(AUDIO)

FIG. 7A

| | ID 0 | ID 1 |
|---|---|---|
| MSB | SEQ 3 | SYNCH 7 |
| | SEQ 2 | SYNCH 6 |
AAUX SYNCH | SEQ 1 | SYNCH 5 |
AUDIO SYNCH | SEQ 0 | SYNCH 4 |
VIDEO SYNCH | TRACK 3 | SYNCH 3 |
| | TRACK 2 | SYNCH 2 |
| | TRACK 1 | SYNCH 1 |
| LSB | TRACK 0 | SYNCH 0 |

FIG. 7B

| | ID 0 | ID 1 |
|---|---|---|
| MSB | AP1/AP2 2 | SYNCH 7 |
| | AP1/AP2 1 | SYNCH 6 |
PRE-SYNCH | AP1/AP2 0 | SYNCH 5 |
POST SYNCH | SEQ 0 | SYNCH 4 |
C2 PARITY SYNCH | TRACK 3 | SYNCH 3 |
| | TRACK 2 | SYNCH 2 |
| | TRACK 1 | SYNCH 1 |
| LSB | TRACK 0 | SYNCH 0 |

FIG. 10

| WORD NAME | | MSB ... LSB |
|---|---|---|
| PC 0 | (ITEM) | |
| PC 1 | (DATA) | |
| PC 2 | | |
| PC 3 | | |
| PC 4 | | |

FIG. 11

| UPPER (MSB) | LOWER (LSB) | |
|---|---|---|
| 0 0 0 0 | x x x x | CONTROL |
| 0 0 0 1 | x x x x | TITLE |
| 0 0 1 0 | x x x x | CHAPTER |
| 0 0 1 1 | x x x x | PART |
| 0 1 0 0 | x x x x | PROGRAM |
| 0 1 0 1 | x x x x | LINE |
| 0 1 1 0 | x x x x | VAUX |
| 0 1 1 1 | x x x x | AAUX |
| 1 0 0 0 | x x x x | RESERVED |
| ⋮ | ⋮ | |
| 1 1 1 0 | x x x x | |
| 1 1 1 1 | a a a a | SOFT MODE |
| 1 1 1 1 | 1 1 1 1 | NO INFORMATION | a a a a : 0 0 0 0 ~ 1 1 1 0
x x x x : 0 0 0 0 ~ 1 1 1 1

[VAUX PACK STRUCTURE]

FIG. 14A VAUX SOURCE

| | MSB | | | | | | | LSB |
|---|---|---|---|---|---|---|---|---|
| PC 0 | 0 | 1 | 1 | 0 | 0 | 0 | 0 | 0 |
| PC 1 | TENS OF TV CHANNEL | | | | UNITS OF TV CHANNEL | | | |
| PC 2 | B/W | EN | CLF | | HUNDREDS OF TV CHANNEL | | | |
| PC 3 | SOURCE CODE | | 50/60 | | STYPE | | | |
| PC 4 | TUNER CATEGORY | | | | | | | |

FIG. 14B VAUX SOURCE CONTROL

| | MSB | | | | | | | LSB |
|---|---|---|---|---|---|---|---|---|
| PC 0 | 0 | 1 | 1 | 0 | 0 | 0 | 0 | 1 |
| PC 1 | RESERVED | | | | | | | |
| PC 2 | REC ST | 1 | REC MODE | | 1 | DISP | | |
| PC 3 | FF | FS | FC | IL | ST | SC | BCSYS | |
| PC 4 | 1 | GENRE CATEGORY | | | | | | |

FIG. 14C VAUX REC DATE

| | MSB | | | | | | | LSB |
|---|---|---|---|---|---|---|---|---|
| PC 0 | 0 | 1 | 1 | 0 | 0 | 0 | 1 | 0 |
| PC 1 | DS | TM | TIME ZONE | | | | | |
| PC 2 | 1 | 1 | DAY | | | | | |
| PC 3 | WEEK | | | MONTH | | | | |
| PC 4 | YEAR | | | | | | | |

FIG. 14D VAUX REC TIME

| | MSB | | | | | | | LSB |
|---|---|---|---|---|---|---|---|---|
| PC 0 | 0 | 1 | 1 | 0 | 0 | 0 | 1 | 1 |
| PC 1 | S2 | S1 | TENS OF FR. | | UNITS OF FRAMES | | | |
| PC 2 | S3 | TENS OF SECONDS | | | UNITS OF SECONDS | | | |
| PC 3 | S4 | TENS OD MINUTES | | | UNITS OF MINUTES | | | |
| PC 4 | S6 | S5 | TENS OF H. | | UNITS OF HOURS | | | |

FIG. 14E VAUX REC TIME BINARY GROUP

| | MSB | | | | | | | LSB |
|---|---|---|---|---|---|---|---|---|
| PC 0 | 0 | 1 | 1 | 0 | 0 | 1 | 0 | 0 |
| PC 1 | 2ND BINARY | | | | 1ST BINARY | | | |
| PC 2 | 4TH BINARY | | | | 3RD BINARY | | | |
| PC 3 | 6TH BINARY | | | | 5TH BINARY | | | |
| PC 4 | 8TH BINARY | | | | 7TH BINARY | | | |

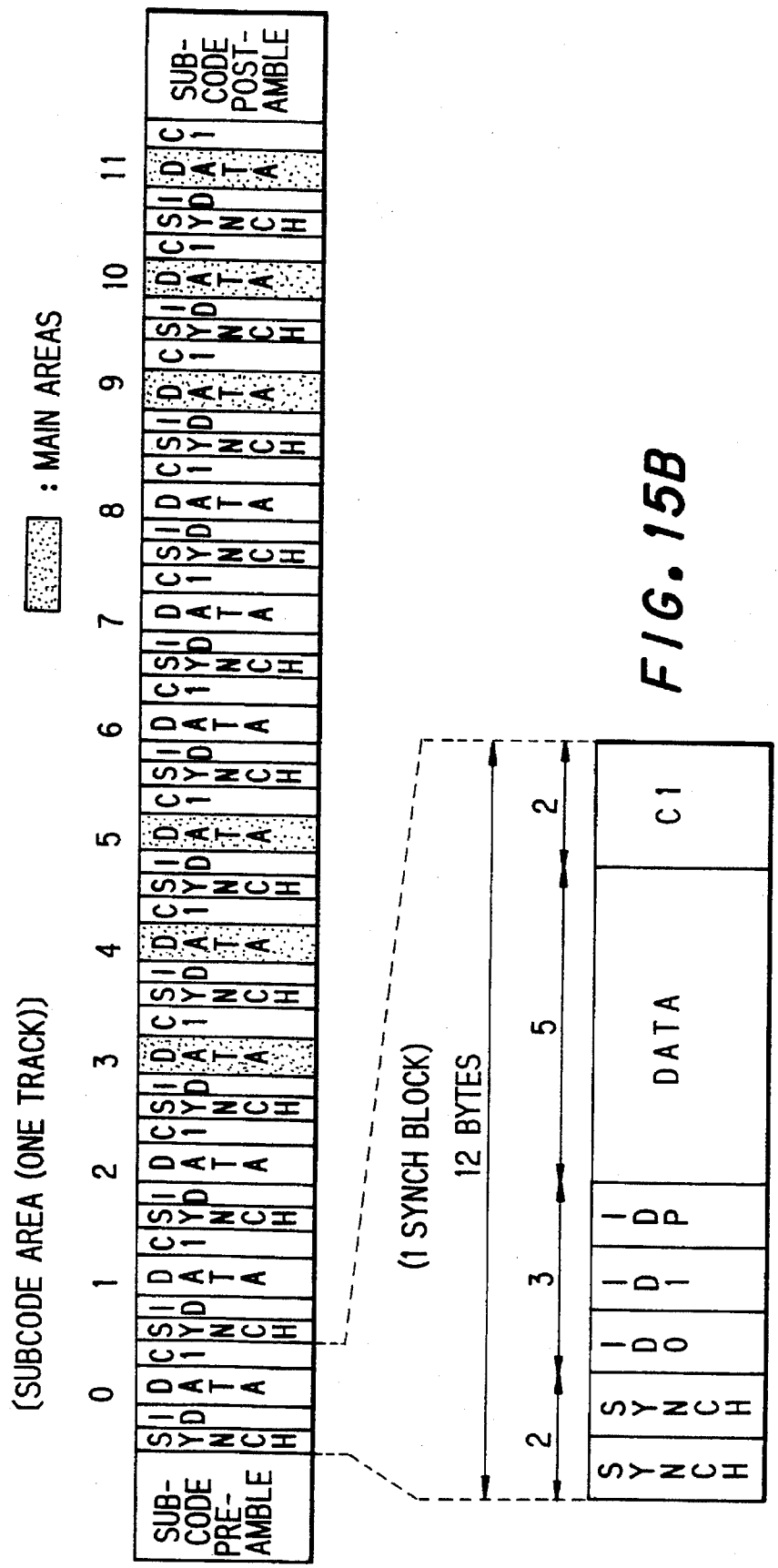

FIG. 16

| | ID0 | ID1 | | IDP | |
|---|---|---|---|---|---|
| MSB | LSB MSB | LSB MSB | LSB | MSB | LSB |
| | | S.B. NO. | | | |
| FR | AP3 | | 0 | PARITY | |
| FR | TAG ABSOLUTE TRACK NO. | | 1 | PARITY | |
| FR | TAG | | 2 | PARITY | |
| FR | TAG ABSOLUTE TRACK NO. | | 3 | PARITY | |
| FR | TAG | | 4 | PARITY | |
| FR | TAG | | 5 | PARITY | |
| FR | AP3 ABSOLUTE TRACK NO. | | 6 | PARITY | |
| FR | TAG | | 7 | PARITY | |
| FR | TAG | | 8 | PARITY | |
| FR | TAG ABSOLUTE TRACK NO. | | 9 | PARITY | |
| FR | TAG | | 10 | PARITY | |
| FR | RSV | | 11 | PARITY | |

RSV : RESERVED

| INDEX ID | SKIP ID | PP ID |
|---|---|---|

FIG. 17

| S.B.NO. | 5 FIRST-HALF TRACKS | 5 LAST-HALF TRACKS |
|---|---|---|
| 0 | OPTIONAL DATA | OPTIONAL DATA |
| 1 | OPTIONAL DATA | OPTIONAL DATA |
| 2 | OPTIONAL DATA | OPTIONAL DATA |
| 3 | TTC | TTC |
| 4 | TTC OR BIN | REC DATE |
| 5 | TTC | REC TIME |
| 6 | OPTIONAL DATA | OPTIONAL DATA |
| 7 | OPTIONAL DATA | OPTIONAL DATA |
| 8 | OPTIONAL DATA | OPTIONAL DATA |
| 9 | TTC | TTC |
| 10 | TTC OR BIN | REC DATE |
| 11 | TTC | REC TIME |

FIG. 19

TITLE TIME CODE

| | MSB | | | LSB |
|---|---|---|---|---|
| PC 0 | 0 0 0 1 | | 0 0 1 1 | |
| PC 1 | S2 | S1 | TENS OF FR. | UNITS OF FRAMES |
| PC 2 | S3 | | TENS OF SECONDS | UNITS OF SECONDS |
| PC 3 | S4 | | TENS OF MINUTES | UNITS OF MINUTES |
| PC 4 | S6 | S5 | TENS OF H. | UNITS OF HOURS |

FIG.18

| TRACK NO.→ | 0 | 1 | 2 | 3 | 4 | 5 | 6 | 7 | 8 | 9 |
|---|---|---|---|---|---|---|---|---|---|---|
| 11 | C | C | C | C | C | E | E | E | E | E |
| 10 | B | B | B | B | B | D | D | D | D | D |
| 9 | A | A | A | A | A | A | A | A | A | A |
| 8 | f | c | f | c | f | m | i | m | i | m |
| 7 | e | b | e | b | e | k | h | k | h | k |
| 6 | d | a | d | a | d | j | g | j | g | j |
| 5 | C | C | C | C | C | E | E | E | E | E |
| 4 | B | B | B | B | B | D | D | D | D | D |
| 3 | A | A | A | A | A | A | A | A | A | A |
| 2 | c | f | c | f | c | i | m | i | m | i |
| 1 | b | e | b | e | b | h | k | h | k | h |
| 0 | a | d | a | d | a | g | j | g | j | g |

↑ SYNCH BLOCK NO.

FIG.20

| TRACK NO.→ | 0 | 1 | 2 | 3 | 4 | 5 | 6 | 7 | 8 | 9 | 10 | 11 |
|---|---|---|---|---|---|---|---|---|---|---|---|---|
| 11 | C | C | C | C | C | C | E | E | E | E | E | E |
| 10 | B | B | B | B | B | B | D | D | D | D | D | D |
| 9 | A | A | A | A | A | A | A | A | A | A | A | A |
| 8 | f | c | f | c | f | c | m | i | m | i | m | i |
| 7 | e | b | e | b | e | b | k | h | k | h | k | h |
| 6 | d | a | d | a | d | a | j | g | j | g | j | g |
| 5 | C | C | C | C | C | C | E | E | E | E | E | E |
| 4 | B | B | B | B | B | B | D | D | D | D | D | D |
| 3 | A | A | A | A | A | A | A | A | A | A | A | A |
| 2 | c | f | c | f | c | f | i | m | i | m | i | m |
| 1 | b | e | b | e | b | e | h | k | h | k | h | k |
| 0 | a | d | a | d | a | d | g | j | g | j | g | j |

↑ SYNCH BLOCK NO.

FIG.22

| SYNCH BLOCK NO. | EVEN-NUMBER TRACK | ODD-NUMBER TRACK |
|---|---|---|
| 0 ~ 2 | 2 | 3 |
| 3 ~ 5 | 1 | 1 |
| 6 ~ 8 | 3 | 2 |
| 9 ~ 11 | 1 | 1 |

FIG.23

| TRACK NO. 0 ~ 4 | TRACK NO. 5 ~ 9 |
|---|---|
| 1 | 2 |

FIG.27A

| SYNCH BLOCK NO. ||
|---|---|
| NO.3~5, NO.9~11 | NO.0~2, NO.6~8 |
| P1 | P2 |

FIG.27B

| SYNCH BLOCK NO. ||||||
|---|---|---|---|---|---|
| NO.3 | NO.4 | NO.5 | NO.9 | NO.10 | NO.11 |
| P6 | P5 | P4 | P3 | P2 | P1 |

FIG.27C

| | SYNCH BLOCK NO. ||||||
|---|---|---|---|---|---|---|
| | NO.0 | NO.1 | NO.2 | NO.6 | NO.7 | NO.8 |
| EVEN-NUMBER TRACK | P6 | P5 | P4 | P3 | P2 | P1 |
| ODD-NUMBER TRACK | P3 | P2 | P1 | P6 | P5 | P4 |

FIG.32A VIDEO
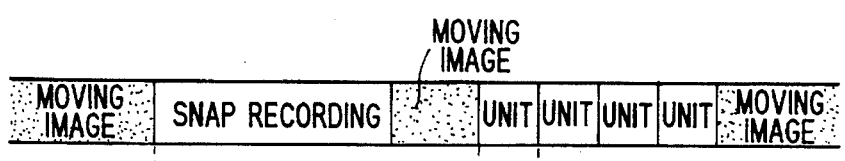
FIG.32B PP ID
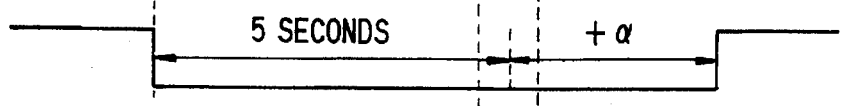
FIG.32C FC
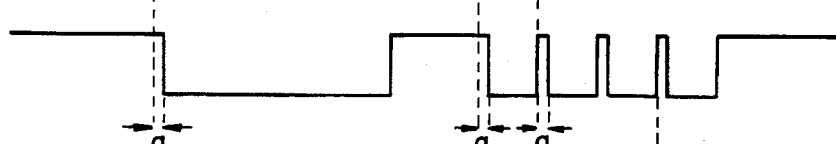
FIG.32D ST
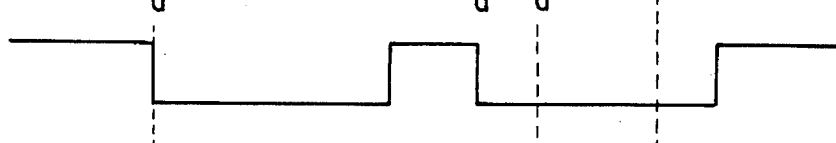
FIG.32E SC
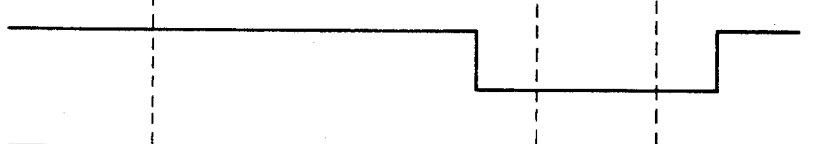
FIG.32F INDEX ID
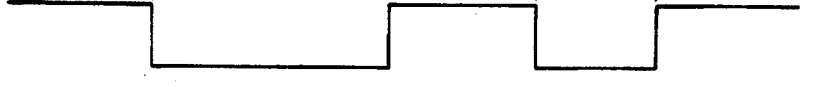
FIG.33A VIDEO
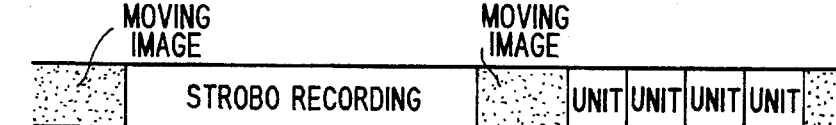
FIG.33B PP ID
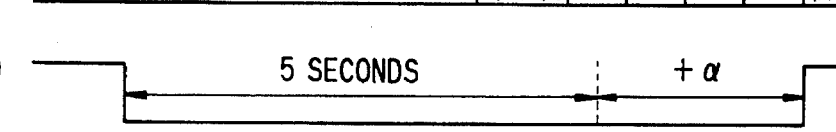
FIG.33C FC
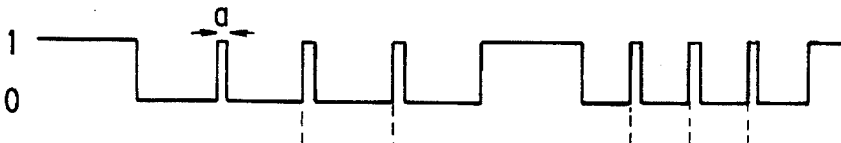
FIG.33D ST
FIG.33E SC
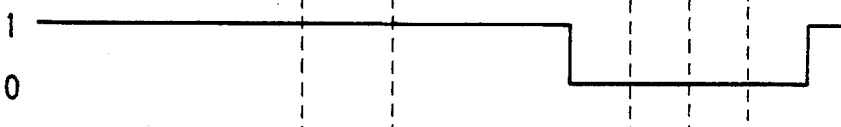
FIG.33F INDEX ID
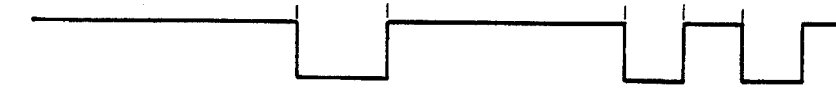

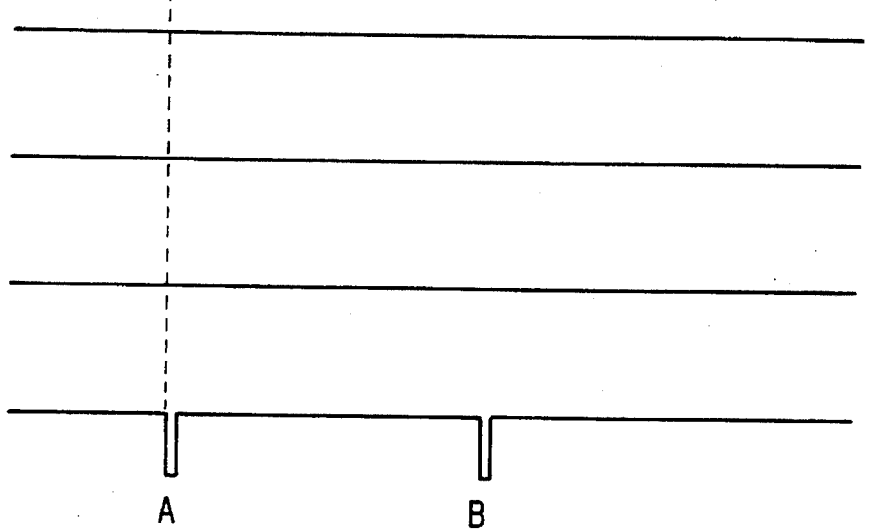

DIGITAL VIDEO SIGNAL RECORDING AND REPRODUCING APPARATUS THAT RECORDS AND REPRODUCES BOTH STILL AND MOVING PICTURES

BACKGROUND OF THE INVENTION

The present invention relates to a digital video signal recording and reproducing apparatus for recording and reproducing video signals in the form of coded signals and, more particularly, to recording, reproducing and searching for coded signals having a predefined format that represent moving pictures and still pictures.

In a conventional video recording and reproducing apparatus, such as a video cassette recorder (VCR) or a camcorder, video signals representing moving pictures are recorded on a tape for subsequent reproduction. To advance or reverse the tape so that reproduction of the moving pictures begins from a desired position, the tape is searched or cued for an INDEX ID, a five second signal recorded at the desired position. As an example, FIG. 1 shows a portion of a video tape representing the end of a Program 1 and the beginning of a Program 2. An INDEX ID is recorded at the beginning of Program 2 for high speed cuing. To begin reproduction at the beginning of Program 2, the conventional video recording apparatus first searches for this INDEX ID and, upon finding the INDEX ID, begins reproduction.

The conventional cuing method has the drawback that it is only effective when cuing a desired position in a series of moving pictures recorded for a time greater than the five second INDEX ID interval. In a camcorder in which still pictures as well as moving pictures are recorded, the still pictures are recorded for a time much shorter than the five second INDEX ID interval, and the conventional cuing method cannot be used to search for a recorded still picture.

A further drawback of the above-described conventional cuing method is that searches for a desired position on a tape using information other than the INDEX ID symbol, such as recording time and date or recording content, are also desired.

OBJECTS AND SUMMARY OF THE INVENTION

Therefore, an object of the present invention is to provide a digital video and audio signal recording and reproducing apparatus which overcomes the problems associated with the prior art.

Another object of the present invention is to provide a digital video and audio signal recording and reproducing apparatus having the capability of high speed cuing of both still pictures and moving pictures.

A further object of the present invention is to provide a digital video and audio signal recording and reproducing apparatus which records and reproduces signals representing the positions of still pictures as well as the beginning of a desired moving picture interval.

A still further object of the present invention is to provide a digital video and audio signal recording and reproducing apparatus in which information accompanying the moving and still pictures are recorded and reproduced.

In accordance with an aspect of this invention, an apparatus records digital video signals in the form of coded signals that represent a recording format which includes a video signal recording area for recording video information and respective accompanying signals and a subcode signal recording area for recording subcode information. The video information represents either a moving picture or a still picture. Accompanying video signals and subcode signals are generated. The subcode signals include location information for locating a portion of the video information on a recording medium. Digital video signals and the accompanying video signals are framed to form blocks of associated video signals which have a predetermined format. The blocks of associated video signals are combined with the subcode signals to form combined signals in predetermined order. When the combined signals are recorded, at least a portion of the subcode signals are recorded on a first track and at least on a second track.

In accordance with this aspect of the invention, the combined signals may be encoded into coded signals and the coded signals recorded on a recording medium. Further, a composite video signal may be inputted and converted to a digital video signal, and the digital video signal compressed, quantized, variable length coded and supplied for framing. Additionally, the recording format may include an audio recording area for recording audio information and accompanying audio signals.

In further accordance with this aspect of the invention, packs of accompanying video signals are formed. Further, the accompanying video signals may include information that indicates whether the video data of a present frame is identical to the video data of an immediately preceding frame, whether the video data of a present frame represents still picture information, and whether the still picture information is reproducible from a reproducing apparatus in which tape travel is temporarily stopped.

In still further accordance with this aspect of the invention, packs of subcode signals may be formed and may include main data and optional data. Plural packs may be included in a track of coded signals with at least two of the main data packs identical. Further, plural packs may be included in a track of the coded signals and plural tracks of the coded signals may be included in a frame of the coded signals, and the main data packs in at least two of the tracks are identical and at least two other main data tracks are identical but differ from the first pair. Additionally, optional data packs in one of the tracks correspond to optional data packs in a second track and optional data packs in a third track correspond to optional data packs in a fourth track but differ from the packs of the first and second tracks.

In still further accordance with this aspect of the invention, ancillary subcode signals may be generated and combined with blocks of the subcode signals and blocks of the associated video signals to form the combined signals. Further, the ancillary subcode signals may include information indicating a period in which the still picture is recorded on a video tape or may include location information for locating a portion of the video information on the recording medium.

As another aspect of the present invention, an apparatus processes digital video signals in the form of coded signals that represent a recording format which includes a video signal recording area and a subcode signal recording area.

As a further aspect of the present invention, an apparatus reproduces digital video and audio signals recorded on a record medium in the form of coded signals that represent a recording format which includes a video signal recording area for recording video information and respective accompanying signals and a subcode signal recording area for recording subcode information. The video information represents either a moving picture or a still picture and the subcode information includes location information for locating a portion of the video information. Coded signals are read from the record medium and decoded into combined signals. The combined signals are separated into blocks of associated video signals and into subcode signals, and the blocks of associated video signals are separated into video signals and into accompanying video signals. The reading of the coded signals is controlled as a function of the accompanying video signals and the subcode signals.

In accordance with this aspect of the invention, the video signals may be stored and the storage of the video signals may be controlled as a function of the accompanying video signals and the subcode signals.

As a further aspect of the present invention, an apparatus records and reproduces digital video signals in the form of coded signals representing a recording format which includes a video signal recording area and a subcode signal recording area.

Other objects, features and advantages of the present invention will become apparent from the following detailed description when read in conjunction with the accompanying drawings in which corresponding elements are identified by the same reference numerals.

BRIEF DESCRIPTION OF THE DRAWINGS

The following detailed description, given by way of example and not intended to limit the present invention solely thereto, will best be appreciated in conjunction with the accompanying drawings, wherein like reference numerals denote like elements and parts, in which:

FIGS. 4A–4B are diagrams showing an embodiment of a recording format of one frame of digital data used with the present invention;

FIGS. 5A–5E are diagrams showing the recording format of FIG. 4 in greater detail;

FIGS. 7A–7B are diagrams showing in detail the preamble and postamble areas of the audio area of FIG. 5;

FIG. 10 is a diagram showing the pack data structure of a universal pack;

FIG. 11 is a diagram showing the "large" items of the pack headers;

FIGS. 14(A)–14(E) are diagrams showing the respective formats of packs of the VAUX signals;

FIGS. 15A–15B are diagrams showing a recording format of a subcode area of the embodiment of FIG. 5;

FIG. 16 is a diagram showing the preamble structure of the subcode area of FIG. 15;

FIG. 17 is a diagram showing repeated recordings of main pack data and optional pack data in the subcode areas of an NTSC frame;

FIG. 18 shows the types of main data recorded in the subcode area of respective tracks of an NTSC frame;

FIG. 19 is a diagram showing the configuration of a Title Time Code pack of the subcode area;

FIG. 20 is a diagram showing repeated recordings of main and optional pack data in subcode areas of a PAL frame;

FIG. 22 is a diagram illustrating the switching operation of the subcode signal generating circuit of FIG. 21;

FIG. 23 is a diagram further illustrating the switching operation of the subcode signal generating circuit of FIG. 21;

FIGS. 27A–27C are diagrams illustrating the switching operation of the subcode data reproducing circuit of FIG. 26;

FIG. 32 is a diagram illustrating the timing of signals associated with recorded still and moving images;

FIG. 33 is a diagram further showing the timing of signals associated with recorded still images;

FIG. 34 is a diagram showing the timing of signals associated with a recorded moving image;

DETAILED DESCRIPTION OF THE PREFERRED EMBODIMENT

The present invention records video signals representing moving image and still pictures and records signals for high speed cuing and reproduction of the recorded video signals.

Figure 1:
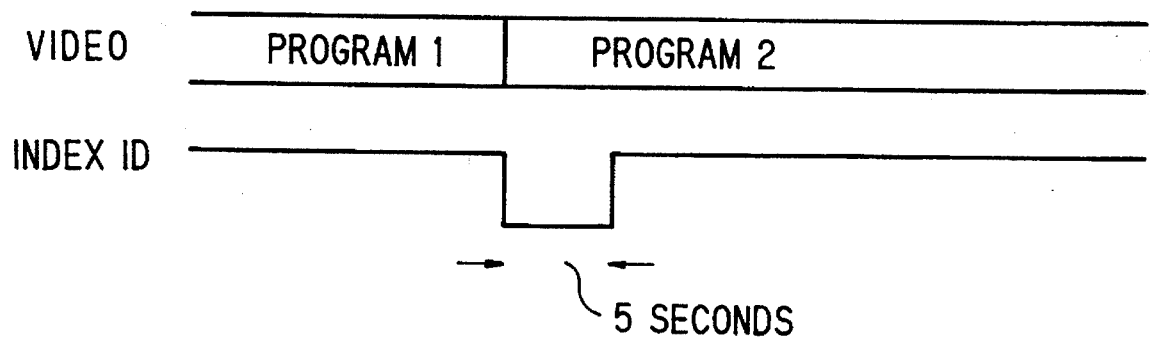
FIG. 1 is a diagram showing the recording of an INDEX ID signal in a conventional recording and reproducing device.
Figure 2:
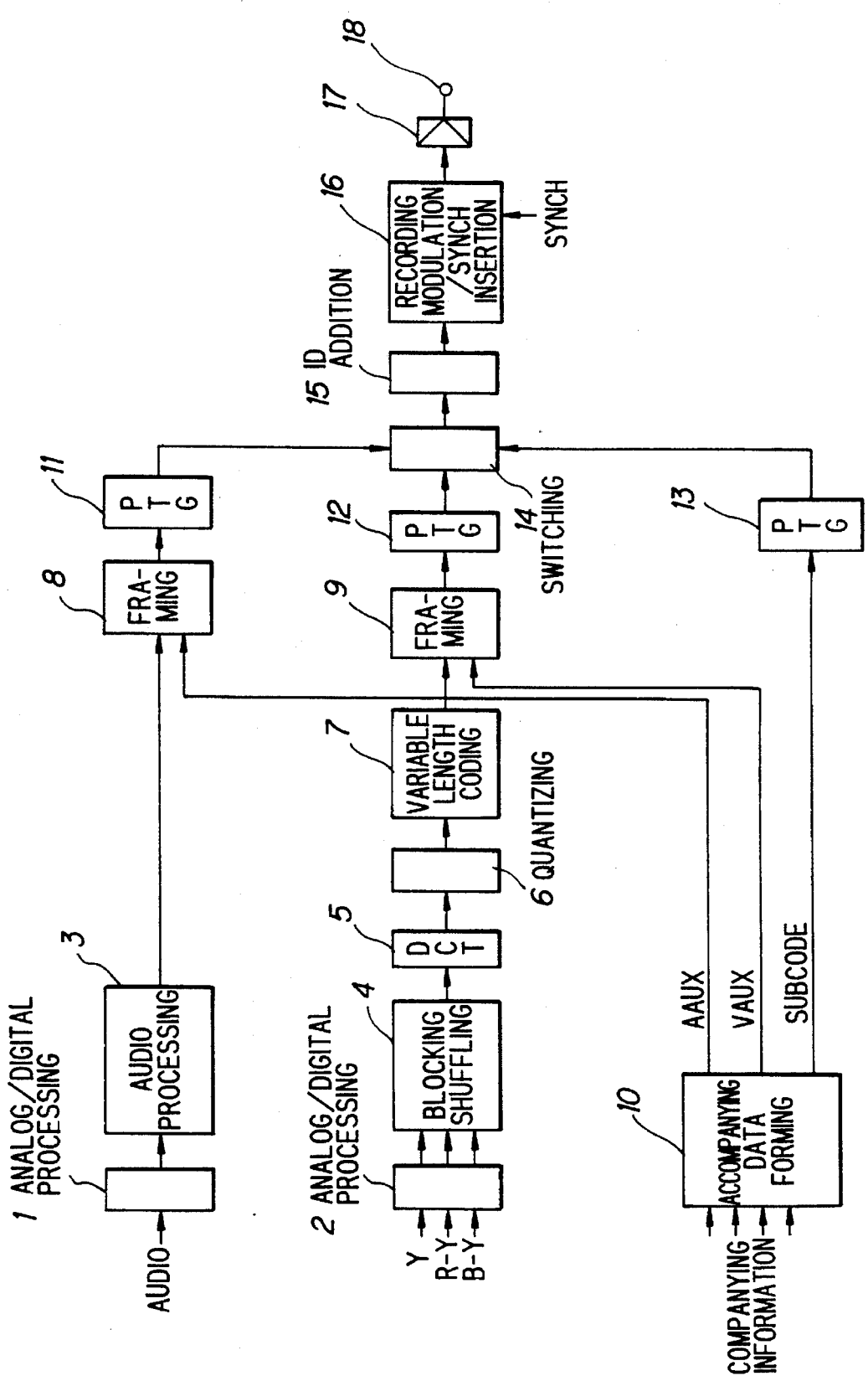
FIG. 2 is a block diagram showing an embodiment of a signal processing circuit of a recording device of the present invention.

FIG. 2 is a block diagram of a signal processing circuit of the recording side of a digital VTR according to an embodiment of the present invention. The circuit shown in FIG. 2 is operable to process analog audio signals, analog composite video signals and accompanying data for recording by a digital VCR.

As shown in FIG. 2, an input audio signal is converted to digital audio signals by an A/D processing circuit 1 which delivers the digital audio signal to an audio processing circuit 3. The audio processing circuit 3 processes the digital audio signal, such as by time compression, and delivers the processed audio signals to a framing circuit 8.

An accompanying data forming circuit 10 receives accompanying audio information and delivers accompanying video signals, such as formatted AAUX signals, to the framing circuit 8 which forms blocks of framed audio signals in a predefined format from the audio signals and the formatted AAUX signals. The blocks of framed audio signals are delivered to a parity generating circuit 11 which adds an error correcting code and delivers the signals to a switching circuit 14.

An analog composite video signal, comprised of component video signals Y, R-Y, and B-Y, is supplied to an A/D processing circuit 2, which converts the analog composite video signal to a composite digital video signal and delivers the signal to a blocking/shuffling circuit 4.

Figure 3A:
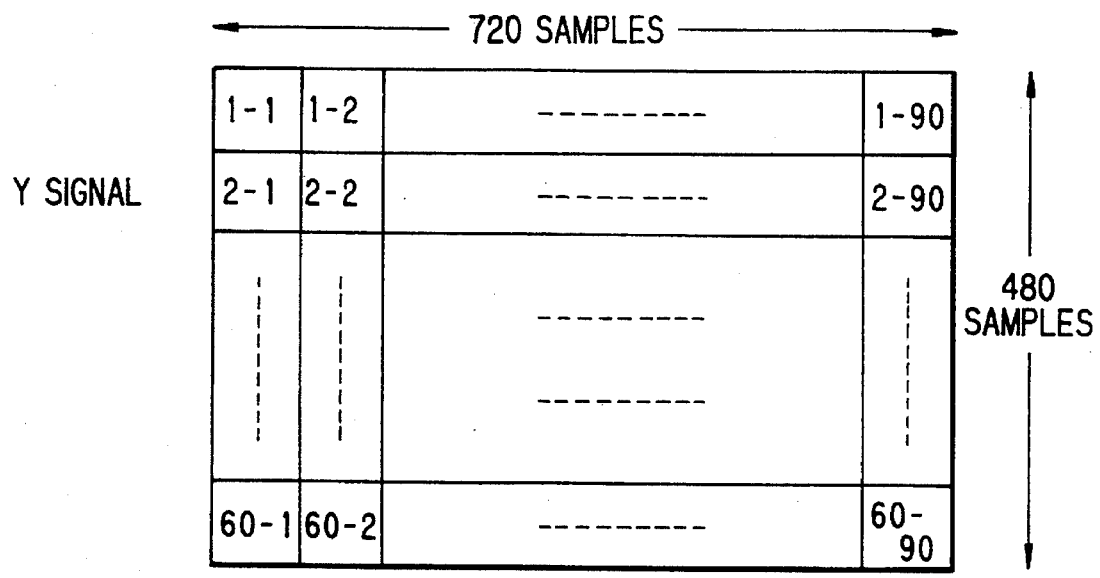
FIGS. 3A–3B are diagrams respectively showing the sampling of luminance signals and color difference signals used with the present invention.

The blocking/shuffling circuit 4 samples the data in an effective scan area of one frame of the composite digital video signal and arranges the samples into units. As shown in FIG. 3A for the NTSC system, for example, the Y signal of a frame is divided into 720 horizontal samples and 480 vertical samples and grouped into units of eight horizontal samples by eight vertical samples, for a total of 5400 units.

Figure 3B:
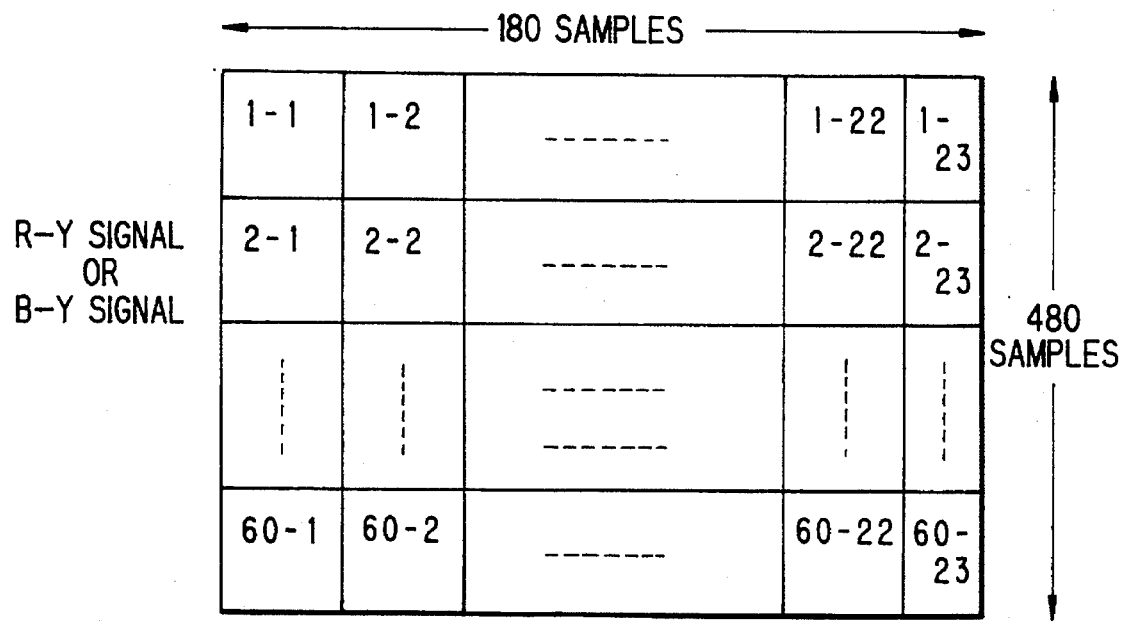

The (R-Y) and (B-Y) color difference signals of a frame, as shown in FIG. 3B for the NTSC system, are each divided by the blocking/shuffling circuit 4 into 180 horizontal samples and 480 vertical samples and grouped into units of 8 horizontal samples by 8 vertical sample units, for a total of 2700 units. Because the units located at the rightmost end of each frame shown in FIG. 3B are formed of four horizontal samples, two vertically adjoining units are treated as one unit. Accordingly, a total of 8100 units are constructed from the Y signals and from the color difference signals of one frame.

The blocking/shuffling circuit 4 supplies the units to a Discrete Cosine Transform (DCT) circuit 5 which transforms the units into DCT units and delivers the DCT units to quantizing circuit 6. The quantizing circuit 6 quantizes the DCT units and supplies the quantized DCT units to a variable length encoding circuit 7 which variable length encodes the quantized DCT units. The quantizing circuit 6 quantizes the DCT units in buffering units of 30 DCT units each, so that the length of the variable length encoded output of the variable length encoding circuit 7 is within a predetermined value.

The operation of the blocking/shuffling circuit 4, Discrete Cosine Transform (DCT) circuit 5, the quantizing circuit 6, and the variable length encoding circuit 7 are known in the art and are not further described.

The variable length encoding circuit 7 delivers the variable length encoded output to a framing circuit 9. The accompanying data forming circuit 10 receives accompanying video information and delivers accompanying video signals, such as formatted VAUX signals, to the framing circuit 9, which forms blocks of framed video signals in a predefined format from the variable length encoded output and the VAUX signals. The blocks of framed video signals are delivered to a parity generating circuit 12, which adds an error correcting code and delivers the signals to the switching circuit 14.

The accompanying data forming circuit 10 also receives subcode information and delivers formatted subcode signals to the switching circuit 14.

The switching circuit 14 alternately supplies the blocks of framed audio signals, the blocks of framed video signals and the formatted subcode signals to an ID data adding circuit 15 which affixes respective ID data to each block of framed audio signals, each block of framed video signals and to the formatted subcode signals and supplies the signals to a recording signal modulating circuit 16. The recording signal modulating circuit 16 affixes a SYNC signal to the signals and supplies the signals to recording amplifier 17 for output via output terminal 18.

The signals outputted from output terminal 18 are supplied to a recording head for recording onto a recording medium or, alternatively, are transmitted.

FIG. 4 shows a recording format for the signals formed by the processing circuit shown in FIG. 2. A plurality of helically recorded tracks form one picture frame, as shown in FIG. 4A. In the NTSC format, a frame is recorded in ten tracks, and in the PAL format a frame is recorded in 12 tracks. FIG. 4B shows the recording format for one track of the frame. The track is bounded by margins, and starting from the leftmost margin, which represents the recording start end, there are recorded an Insert and Track Information (ITI) Area, an audio area, a video area and a subcode area. Inter-block gaps, which serve as a margin for editing and for prevention of overwriting of data, are recorded between each of these areas.

FIG. 5 shows the respective areas at one track in greater detail. The ITI area, shown in FIG. 5B, stores position information for accurate head scanning and after-recording of the track and functions in a manner similar to the ATF signal of an 8 mm video tape. The ITI area includes a 1400 bit pre-amble sector, a start-sync (SSA) sector, a track information sector (TIA), and a post-amble sector. The TIA sector has a length of 90 bits and includes the main application identification data (APT) which defines the data structure of the remainder of the track.

The audio area, shown in FIG. 5C, is comprised of a pre-amble sector, which includes a run-up block and a pre-sync block, an audio sector and a post-amble sector, which includes post-sync and guard area blocks. The pre- and post-sync blocks include a 2 byte sync region formed by recording signal modulating circuit 16 using 24 to 25 conversion, and a 3 byte ID region formed by ID data adding circuit 15.

The ID region is divided into an ID0 byte, an ID1 byte and an IDP byte. The ID0 bytes, shown in greater detail in FIGS. 7A and 7B, store data such as application data bits AP1 or AP2, for indicating the data format of the sync blocks, sequencing data bits SEQ for identifying the frame number during a variable speed playback mode and track data bits TRACK for identifying the track number of the frame. The ID1 bytes, also shown in FIGS. 7A–7B, store sync data, and the IDP byte stores parity data.

Figure 6A:
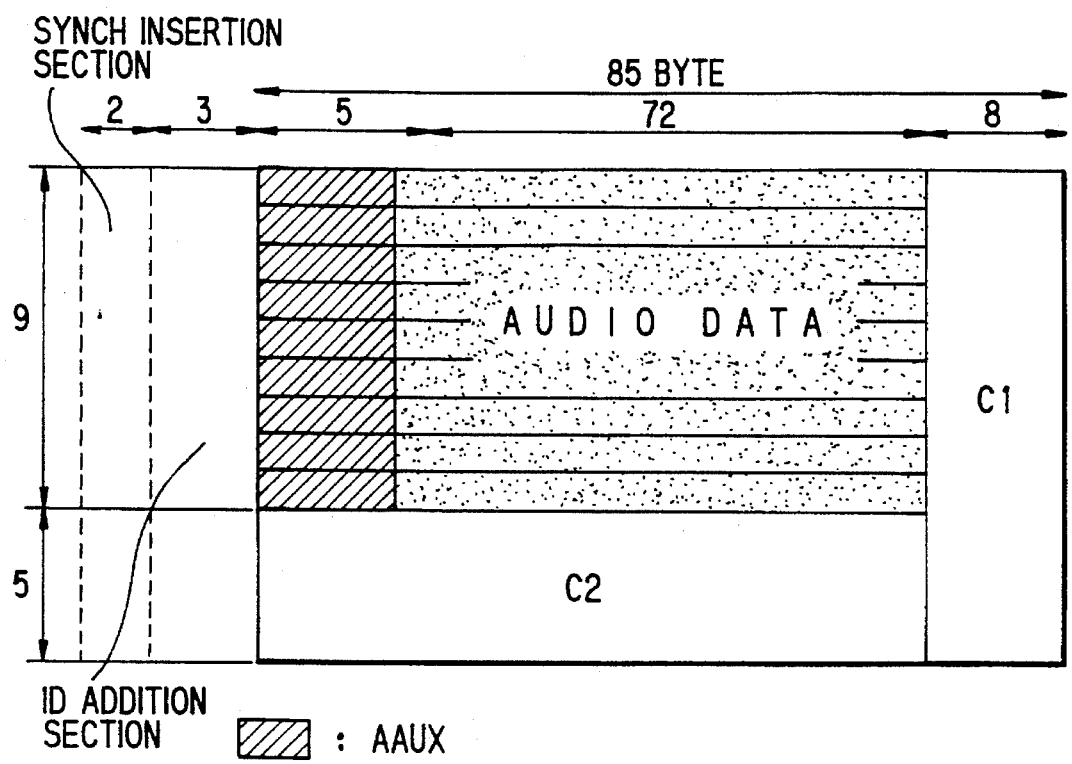
FIGS. 6A–6B are diagrams showing in detail the audio area of FIG. 5.
Figure 6B:
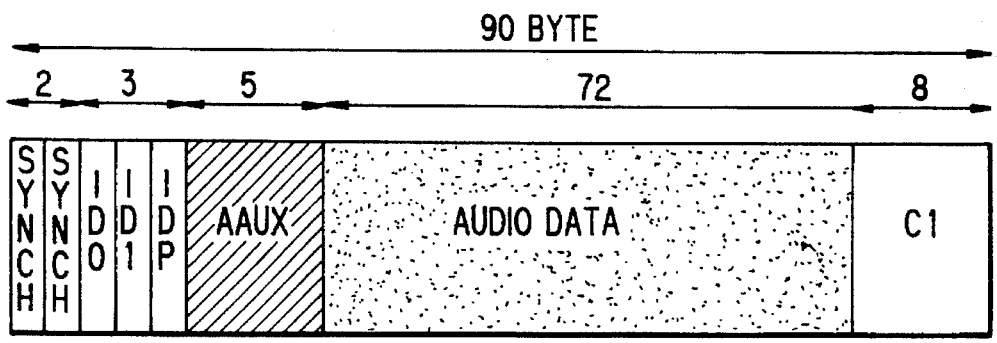

The audio sector of the audio area, shown in FIG. 6A, is divided into 9 sync blocks of 77 bytes each. The audio sync blocks include 5 bytes of AAUX signals, 72 bytes of audio data, and 8 bytes of inner parity data C1. FIG. 6B illustrates one of the nine audio sync blocks. The lower five sync blocks C2 are parity sync blocks and include outer parity data and inner parity data.

The video area, shown in FIG. 5D, includes a pre-amble sector, which includes run-up and pre-sync regions, a video sector, and a post-amble sector, which includes post-sync and guard area regions. As in the audio sector, the video sector is divided into sync blocks and each sync block includes 4 bytes of sync data and 3 bytes of ID data, shown in FIG. 8. The pre-sync blocks and the post-sync block are structured in a manner similar to the pre- and post-sync blocks of the audio sector.

Figure 8:
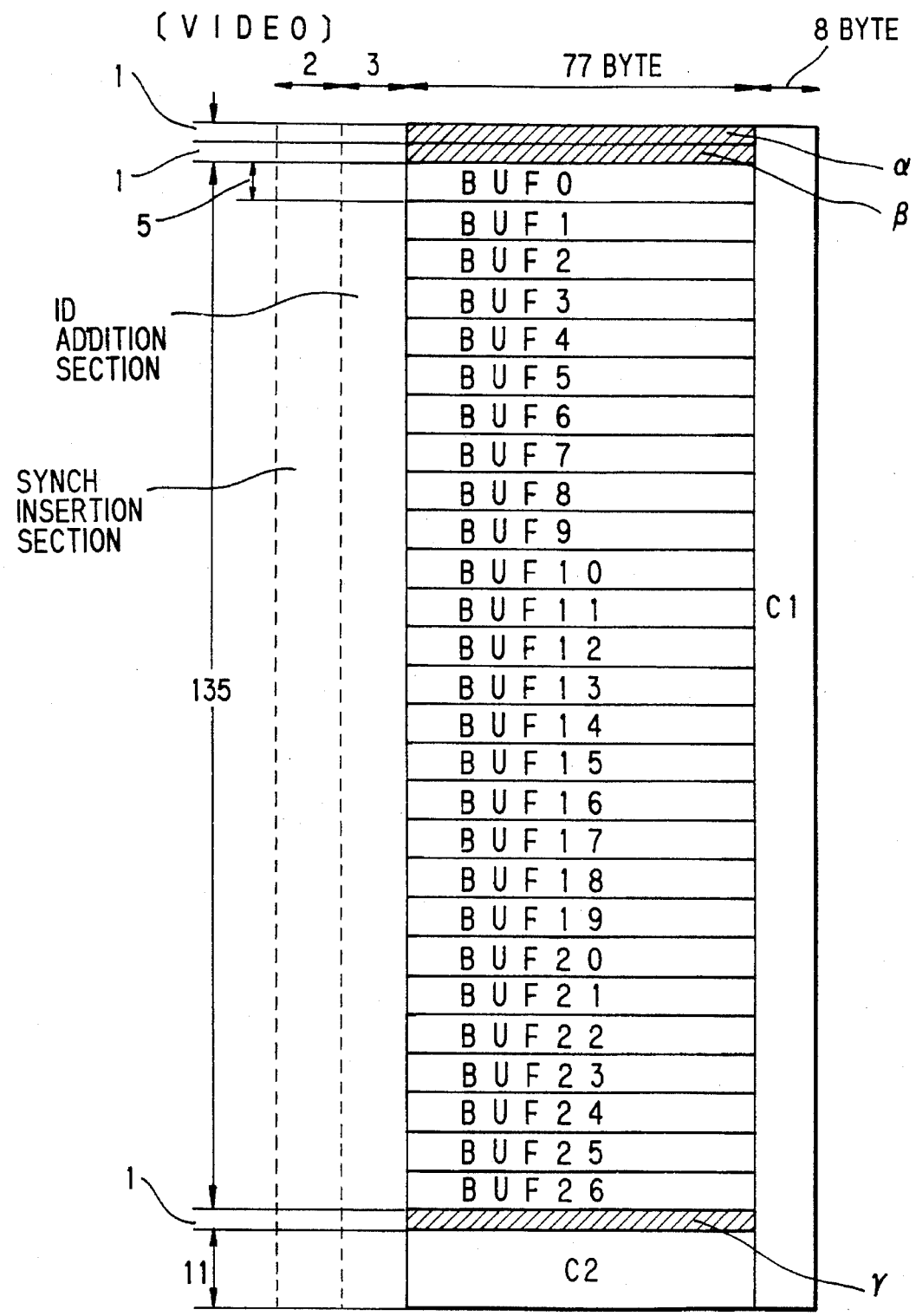
FIG. 8 is a diagram showing a recording format of a video area of the embodiment of FIG. 5.
Figure 9A:
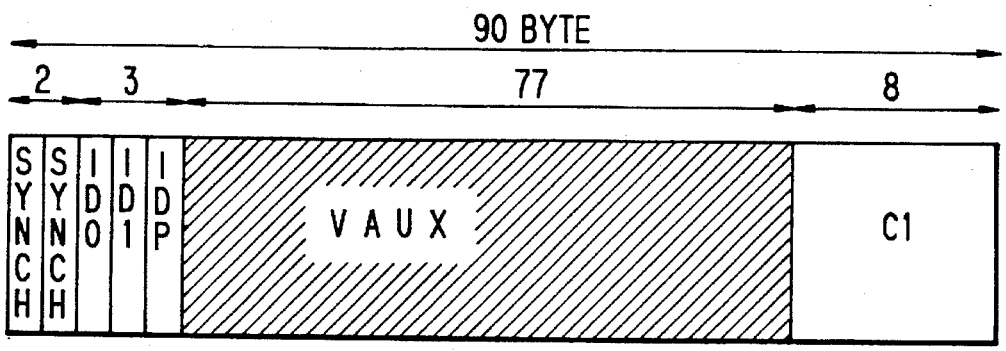
FIGS. 9A–9C are diagrams respectively showing one sync block of VAUX data, one sync block of video data and a plurality of video sync blocks of the video area of FIG. 8.
Figure 9B:
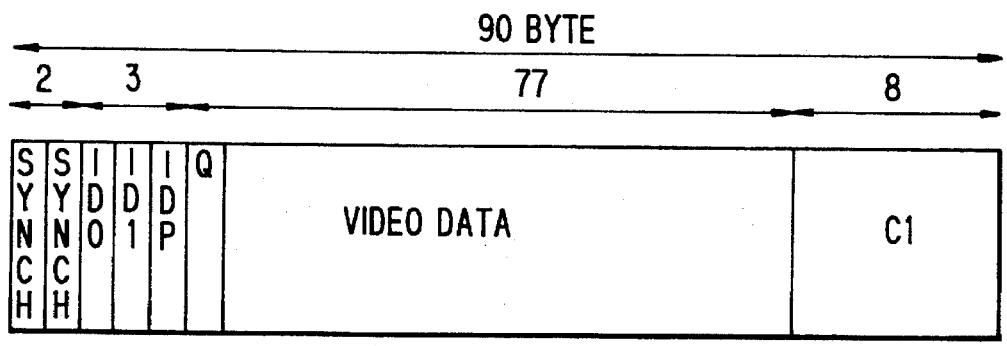

The video sector of the video area is shown in detail in FIG. 8 and includes 151 sync blocks. Sync blocks α, β and γ, shown in greater detail in FIG. 9A, are VAUX sync blocks and store the accompanying information video signals. The remaining sync blocks, as shown in greater detail in FIG. 9B, are video sync blocks and include video data as well as inner parity data. Sync blocks C2 are parity sync blocks and include both outer parity data and inner parity data.

Figure 9C:
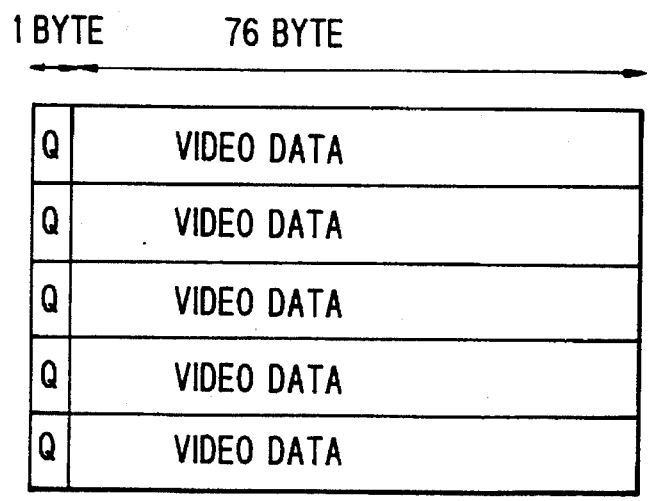

FIG. 9C illustrates a buffering unit formed of five sync blocks, each comprised of the 77 bytes of video data. The first byte is a Q data byte in which quantization data is stored. Following the Q byte, are 76 bytes of video signal data.

The AAUX region of the audio sector of the audio area shown in FIG. 6B and the VAUX region of the video sector of the video area shown in FIG. 9A are each formed of "packs", as shown in FIG. 10. The first byte, PC0, serves as a pack header (ITEM) and the remaining bytes, PC1–PC4, serve as pack data.

The ITEM data is divided into upper 4-bit data and lower 4-bit data. The upper 4-bit data identifies what is referred to as a "large" item, and the lower 4-bit data identifies what is referred to as a "small" item. The upper 4-bit "large" item and the lower 4-bit "small" item define the format and content of the succeeding data. There are at most 16 "large" items, and for each "large" item, there are at most 16 "small" items.

The large items identified by the upper 4 bits of the item data include, as shown in FIG. 11, control [0000], title [0001], chapter [0010], part [0011], and program [0100] items. Line item [0101] indicates data recorded during a vertical blanking period. Other items include video auxiliary data (VAUX) [0110], audio auxiliary data (AAUX) [0111] and soft mode [1111], which is designated for software applications. Large items [1000] to [1110] are reserved items for future applications.

Figure 12:
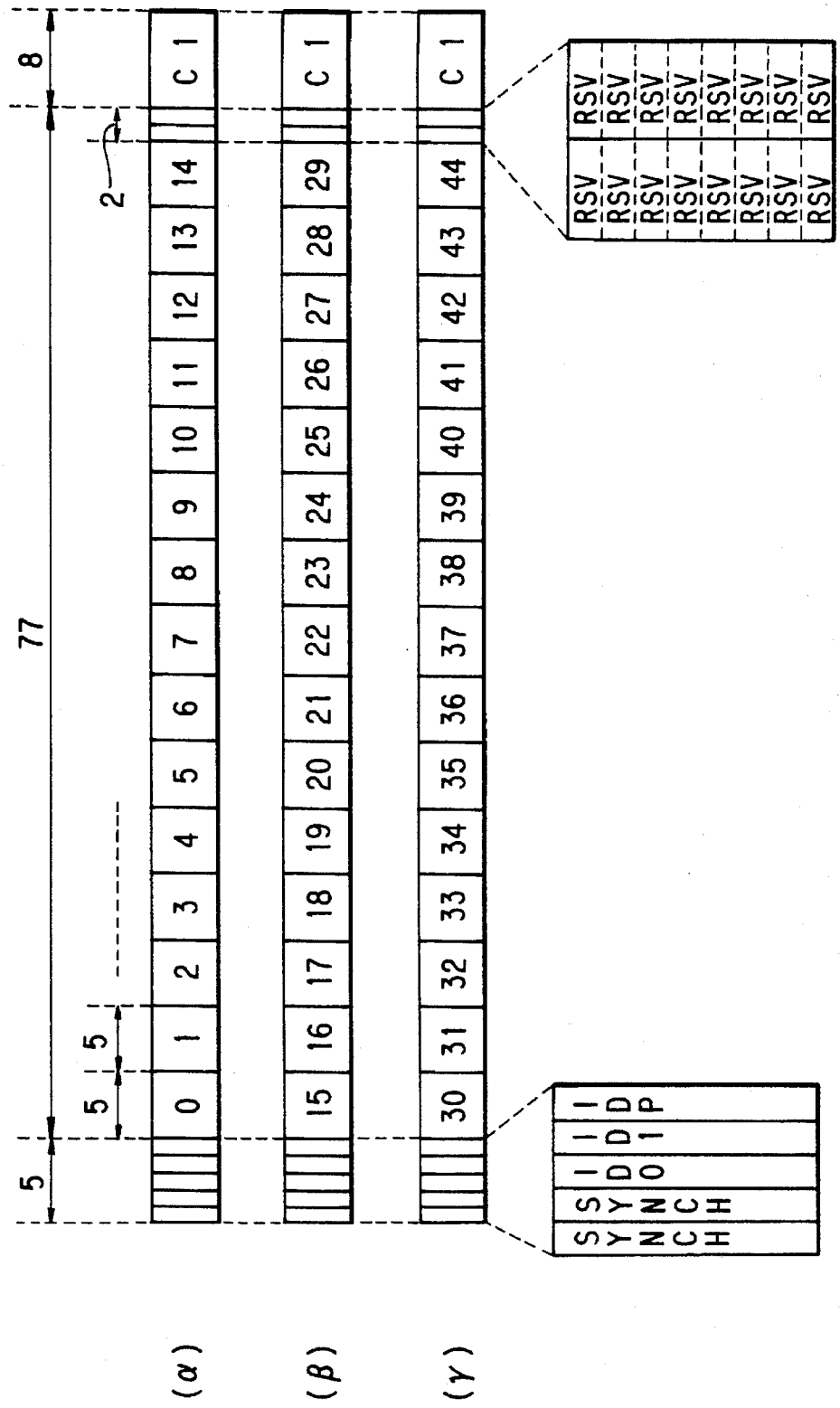
FIG. 12 is a diagram showing in further detail the data structure of the VAUX data of the video area shown in FIG. 8.

The pack structure of the three VAUX sync blocks α, β and γ of the video sector of the video area are shown in FIG. 12. Each VAUX sync block includes 15 5-byte packs, for a total of 45 packs per track. Similarly, nine packs are recorded in the AAUX regions shown in FIG. 6A.

Figure 13:
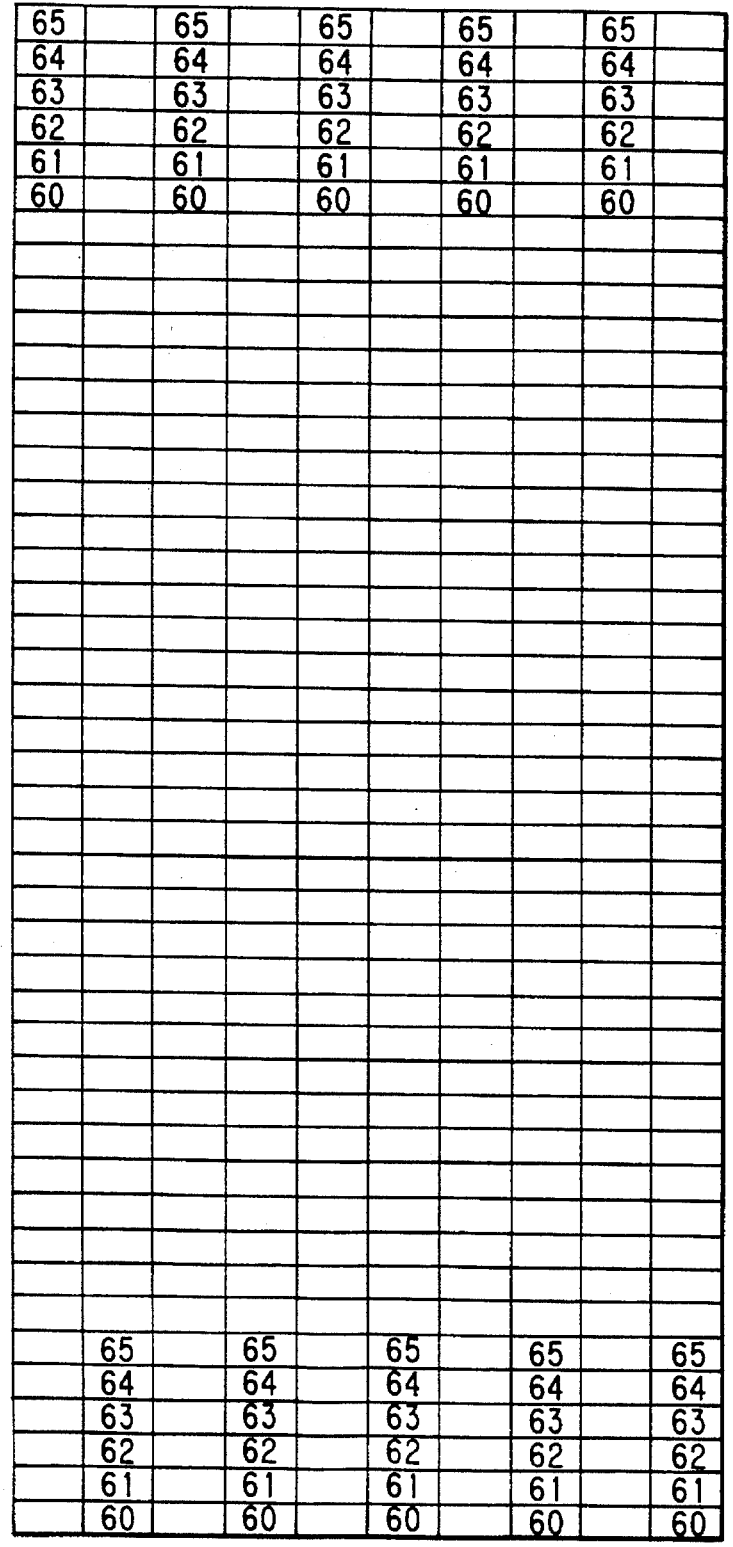
FIG. 13 is a diagram showing the main data regions and the optional data regions of the VAUX signals of a frame of the video area.

FIG. 13 shows the VAUX pack data structure of one frame. In an NTSC frame consisting of 10 tracks, there is a total of 450 VAUX regions, 45 per track. Of the 45 VAUX regions in each track, 6 are designated as main VAUX regions, numbered 60–65, and the remaining are designated as optional regions.

In the main region, there is recorded information regarding basic data common to all tapes. The respective packs forming the main region store information regarding these particular data items.

The data recorded in the main regions of the AAUX and VAUX regions are repeatedly recorded such that the main data is stored in every track and alternates between the recording head trace starting side and the recording head trace ending side of a track. Thus, there is no dropout of data even if the tape is scratched. Further, since the main data are recorded by both the odd-numbered track recording head and the even-numbered track recording head, there is no data drop out even when a head is clogged.

The VAUX packs formed by the large item [0110] and its respective small items, shown in FIG. 14, are now described.

The VAUX SOURCE pack [0110 0000] (the hexadecimal representation of which is "60"), shown in FIG. 14(1), stores the television channel of a picture recording source in the PC1 bits and in four lower-order PC2 bits. The code "CLF" in the PC2 data is a 2-bit code and represents color framing, by which four types of color framing phases can be recorded. "EN" is a flag code which indicates whether or not the code "CLF" is effective. "B/W" is a flag which indicates whether or not the data is a black/white data signal, and "50/60" is a flag which indicates field frequency. "SOURCE CODE" represents the type of source and "STYPE" represents the construction of the recording system, such as the number of recording tracks per frame on the tape.

The SOURCE CONTROL pack [0110 0001] ("61"), shown in FIG. 14(2), includes flag code "REC ST" which indicates whether or not a recording signal is the starting point for recording. "REC MODE" indicates whether a recorded item is an original or an after-recorded item. "BCSYS" represents the aspect ratio. "FF" is a flag which indicates whether or not only a 1-field signal is repeatedly output within one frame. Flag "FS" indicates whether or not the record is an odd-order field, and flag "FC" indicates whether or not the video data in a present frame is the same as the video data in the immediately preceding frame. Flag "IL" indicates whether or not a recording signal is interlaced. "ST" is a flag which indicates whether or not a recording signal is a still picture signal, and "SC" is a flag which indicates whether or not the image content to be recorded is a still picture that is reproduced with the tape travel of a reproducing VTR temporarily stopped. "GENRE CATEGORY" is a code which represents the genre of a recorded item.

FIG. 14(3) shows the VAUX REC DATA pack [0110 0010] ("62") and includes flag "DS" which indicates whether or not a recording signal is recorded in Daylight Savings Time. "TM" is a flag which indicates whether or not there is a time zone difference of 30 minutes, and "TIME ZONE" is a code which indicates the existence of a time zone difference. In the PC2 through PC4 data, the day, day of the week, month, and year are recorded.

The VAUX REC TIME pack [0110 0011] ("63"), shown in FIG. 14(4), stores the recording time based on an SMPTE/EBU time code.

FIG. 14(5) shows the VAUX REC TIME BINARY GROUP pack [0110 0100] ("64"), the recording time is recorded using binary numbers. The pack represented by item [0110 0101] ("65") stores closed caption data and is not shown.

The subcode area, shown in FIG. 5E, includes a pre-amble sector, a subcode sector, and a post-amble sector. The format of the subcode area is shown in detail in FIG. 15A and is further divided into 12 sync blocks 0–11, each shown in FIG. 15B. Each sync block includes 2 bytes of sync data, 3 bytes of ID data, 5 bytes of subcode pack data, and 2 bytes of parity data.

In the most significant bit of the ID0 byte of all sync blocks is frame identification bit FR indicating whether the respective track in which the subcode area is recorded is part of a first half of a video frame (FR=0) or part of a second half of a video frame (FR=1). Application data bits AP3 are stored in the nextmost significant bits in the ID0 byte of sync blocks 0, 6 and 11. Divided among the ID0 and ID1 bytes, shown in FIG. 16, is the absolute track number which consists of 23 bytes and provides a track identification used during high speed searching of a tape. This absolute track identification is repeated four times in the synch block.

As shown in an enlarged view of FIG. 16, the TAG code is stored in sync blocks 1–5 and 7–11 and is comprised of three types of search ID signals, namely INDEX ID, SKIP ID, AND PP ID (Photo/Picture ID).

The IDP subsection is recorded with parity data for protecting the ID0 and ID1 subsection data.

The parity data IDP, shown in FIG. 16, includes only 2-bytes of horizontal parity data, and does not include vertical parity data. Therefore, the data protection of the parity data is weaker than that of the audio parity data or video parity data, as there is a higher probability of data being lost when one channel of the reading head is clogged. The reliability of reproduced data may be enhanced by majority judgment performed on the reproduced data during reproduction as described below. Furthermore, the subcode data is repeatedly recorded on the tracks at different positions on different tracks, as is also described below, and thus improves the possibility that data is likely to be readable even where a transverse flaw is present.

The subcode data region of each of the subcode sectors of FIG. 15B is comprised of a 5-byte pack. As shown in FIG. 15A, the subcode data packs in sync blocks 3, 4, 5, 9, 10, and 11 of every subcode sector in a frame represent main data whereas the subcode data packs of the remaining sync blocks in the frame represent optional data.

The main data packs A, B and C are repeatedly recorded in each of the first 5 tracks of a frame, as shown in FIG. 17, and the main data packs A, D and E are likewise recorded in each of the last 5 tracks of a frame. Further, in each of the tracks, the main pack data recorded in the 3rd to 5th SYNC blocks is again recorded in the 9th to 11th SYNC blocks.

As shown in FIG. 18, one of the TTC (Title Time code) pack data, shown in FIG. 19, which indicates the position at which the title of the contents is recorded, and the BIN-code data (Title Time Code Binary Group) is recorded in the first 5 tracks, whereas, the pack data corresponding to the REC DATA and REC TIME-code data in addition to the TTC-code data are recorded in the last 5 tracks. As shown in FIG. 17, the alphabetic characters A and C represent the TTC data, B represents the TTC or BIN data, D represents the REC DATE data, and E represents the REC TIME data.

The optional data packs are also repeatedly recorded, as shown in FIG. 17, and represented by the alphabetic characters a, b, c, ... k, and m. The same optional data packs are repeatedly recorded in each of the first 5 tracks of a frame, though not in the same sync blocks, and the same optional data packs are similarly recorded in each of the last 5 tracks of a frame.

FIGS. 17 and 18 illustrate the subcode block recording pattern according to the NTSC system wherein 10 tracks are recorded per frame. Similarly, the recording pattern for one frame of the subcode data according to the PAL system is shown in FIG. 20. As shown in FIG. 20, a PAL frame is comprised of 12 tracks each comprised of 12 SYNC blocks. The main data packs and the optional data packs are each repeatedly recorded in a manner similar to the recording pattern used for the NTSC system.

Figure 21:
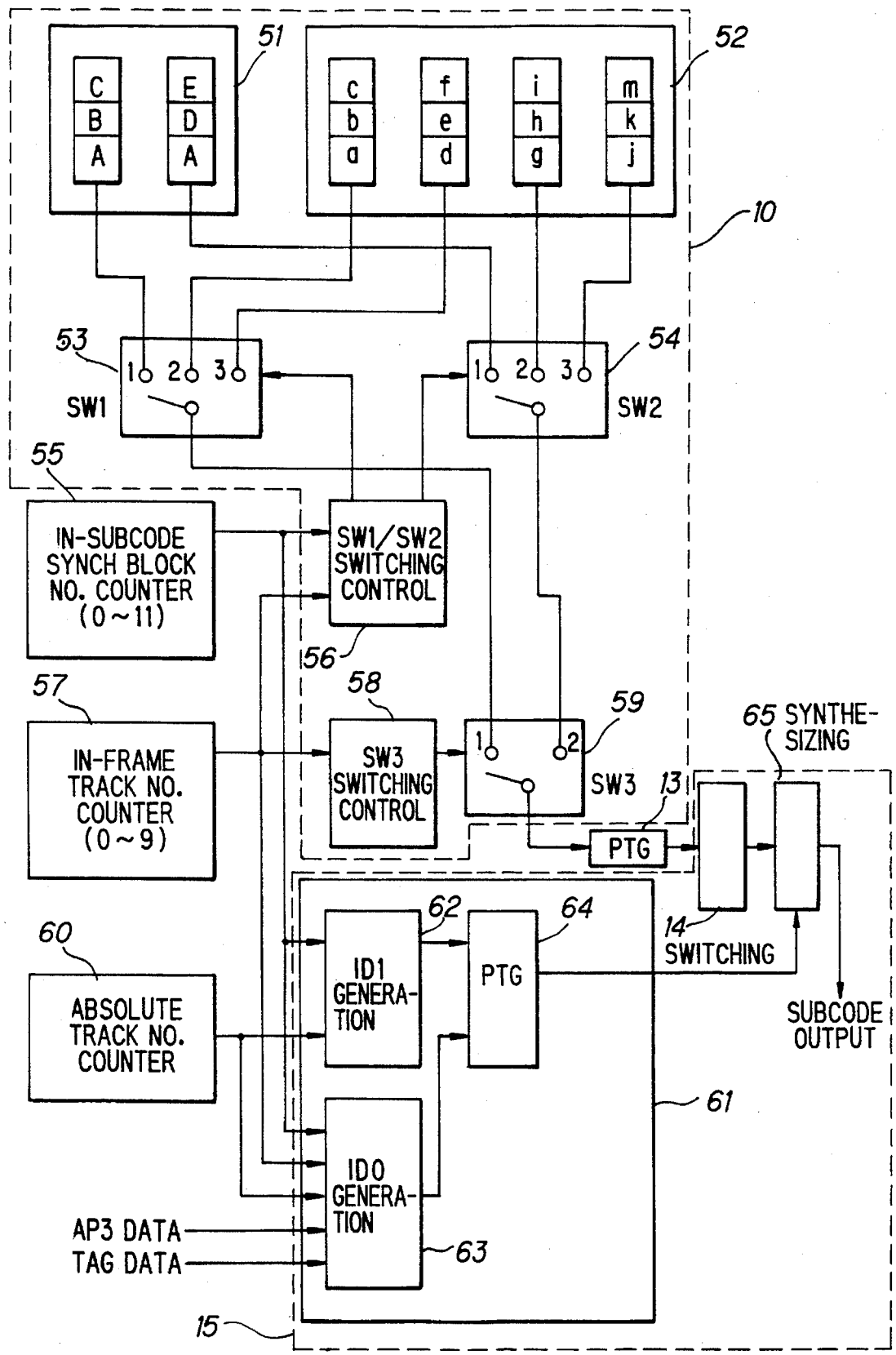
FIG. 21 is a block diagram showing an embodiment of a subcode signal generating circuit of a signal processing circuit of FIG. 2.

FIG. 21 is a block diagram of a subcode signal generating circuit according to an embodiment of the signal processing circuit of FIG. 2. The accompanying data forming circuit 10 includes a main-area pack data storage device 51 and an optional-area pack data storage device 52. The internal memories of the storage devices respectively store the main data packs A to E and the optional data packs a to m shown in FIGS. 18 and 20.

The packs stored in these memories are supplied by the respective storage devices 51 and 52 to one of switches 53 and 54. The switches 53 and 54 are controlled by a switching-control device 56 as a function of the sync block number signals delivered by a SYNC block number counter 55 and as a function of track number signals delivered by in-frame track number counter 57. FIG. 22 shows the connection of switches 53 and 54 to one of input terminals 1 to 3 as a function of these signals. The pack data stored in the first 5 tracks of a frame are delivered by switch 53, whereas the pack data stored in the last 5 tracks of the frame are delivered by the switch 54.

Switches 53 and 54 deliver the pack data to switch 59 which is controlled by switching control device 58 as a function of track number signals delivered by counter 57. FIG. 23 shows the connections of switch 59 to one of input terminals 1 and 2 as a function of the track number signal. Accordingly, switch 59 first outputs subcode pack data for the first 5 tracks of a frame, and then delivers subcode pack data for the remaining 5 tracks, to a parity signal generating circuit 13 (which corresponds in operation to the parity signal generating circuit 13 of FIG. 2) which appends horizontal parity data C1 and delivers the signal to switching circuit 14. The switching circuit 14 operates as described in FIG. 2 and delivers the signals to synthesizing circuit 65.

The sync block number counter 55 delivers a sync block number, and an absolute track number counter 60 delivers an absolute track number to an ID1 signal generating circuit 62 of an ID signal generating circuit 61 of the ID addition circuit 15. ID1 generating circuit 62 generates an ID1 signal and delivers the ID1 signal to parity signal generating circuit 64.

The sync block number counter 55 delivers the sync block number, the in-frame track number counter 57 delivers the in-frame track number signal and the absolute track number counter 60 delivers the absolute track number signal to ID0 generating circuit 63. The ID0 generating circuit 63 also receives AP3 data and TAG data signals. The IDO generating circuit 63 generates the ID0 signal and delivers the ID0 signal to the parity signal generating circuit 64.

The parity signal generating circuit 64 combines the ID0 and the ID1 signals and appends an IDP signal to the signals and delivers the signals to synthesizing circuit 65.

The synthesizing circuit 65 generates respective sync block signals by alternately combining the ID data to the respective subcode pack data.

The advantages of the above-described subcode area are now explained.

The reduced length of the SYNC block allows the same data to be repeatedly recorded several times in the subcode area of one-track and allows the data to be repeatedly recorded several times in one frame. Further, because only horizontal parity data is recorded, and not vertical parity data, the pack data and ID data are read faster by a reproducing device. As a result, high speed searches are as much as 200 times faster than conventional searches.

In particular, when executing a search that references the PP ID and INDEX ID signals stored in the TAG data of the ID section of the subcode areas, or when executing a search that references the absolute track numbers stored in the ID section, only the leading 5-bytes (SYNC and ID section) of data in the SYNC block are read. Also, because only the last 5 tracks of the frame are recorded with the REC DATE and the REC TIME data, when a search based on the recording day, month, and year or based on the recording second, minute, and hour is executed, only these tracks are read.

Further, when a search is executed that references pack data stored in the subcode area, the referenced pack data may be written into the optional data area of the subcode area so that when the search is executed, only the optional pack data is selected and read.

The data stored in the above-described subcode area is also easily rewritten. As an example, the REC DATA and REC TIME data, which are frequently rewritten, are recorded only in the last 5 tracks of an NTSC frame amd readily rewritten.

The data stored in the ID section of the first 5 tracks of the NTSC frame are read, and the data stored in memory. The tape is then advanced and the subcode information of the last 5 tracks is rewritten. In particular, the FR flag, and the AP3 and TAG data are not changed. Further, the absolute track number is updated and also rewritten. The IDP data are calculated from the above data and recorded. The REC DATE and REC TIME data are then recorded in the optional data pack area.

Because the rewritten data are recorded in only the last 5 tracks, the ID section data is easily rerecorded. In contrast, when ID data are recorded in both the first 5 tracks and in the last 5 tracks of the NTIC frame, the subcode data of all the tracks of the frame must be rewritten.

A further advantage of the above-described subcode area structure is that reproduced data can be restored or synchronized using the FR flag. Ordinarily, a data pack that cannot be deciphered is discarded. However, the data packs stored in the above-described subcode area are repeatedly recorded five times in either the first or last 5 tracks of the frame and thus a data pack that would otherwise be lost can be recovered from the data packs stored in one of the other tracks in the same group of 5 tracks. The FR flag is used to determine whether or not the data pack from which data is to be recovered is within the same 5 tracks as the damaged data pack.

Further, a search ID signal such as, for example, an INDEX ID signal may be after-recorded in the subcode area of the first track of a desired frame for later reference during a high-speed search. During the after-recording, the position at which the FR flag value changes from "1" to "0" provides a reference of the first track of the desired frame.

Figure 24:
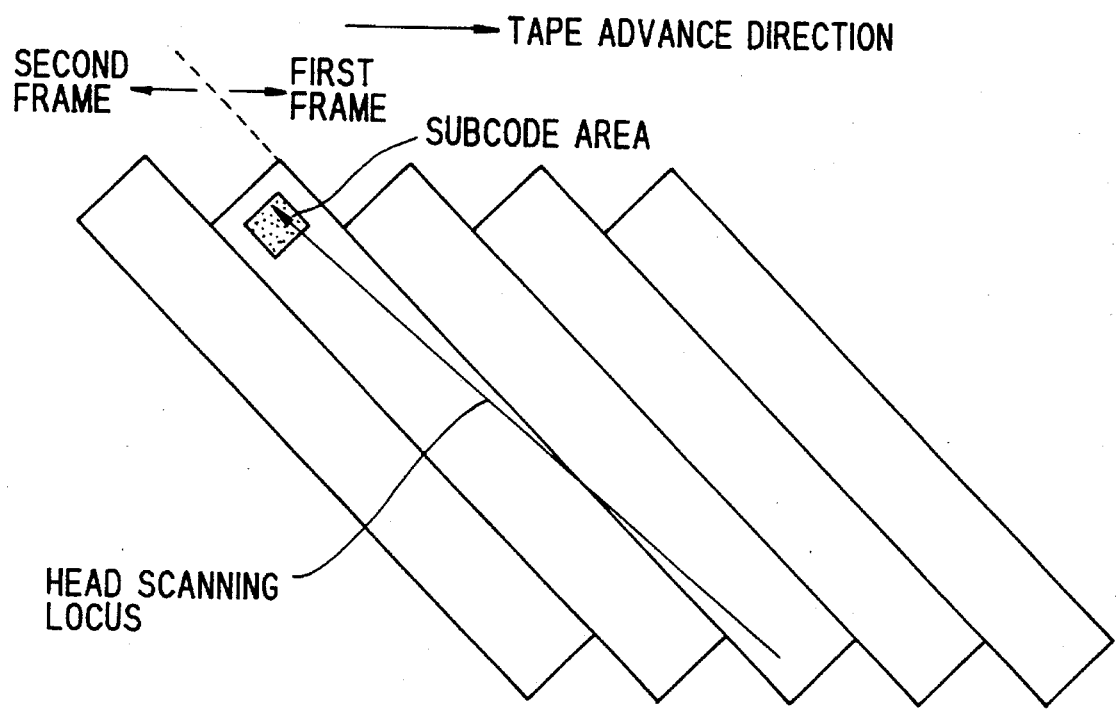
FIG. 24 is a diagram showing the scanning path of a video tape recording head during reproduction at a variable tape speed.

The FR flag also synchronizes data read during variable-speed reproduction. FIG. 24 shows the scan locus of a reading head when the reproduction tape speed is slightly higher than the normal tape playback speed. When the head scans a path which is at or near a boundary between two adjacent frames, the frame from which the video data or audio data is read is often delayed, by one frame, from the frame from which the subcode data is read. Therefore, when a search is based on the contents of the subcode data, it is possible that an image deviating by one frame may be displayed. To correct this error, the transition of the value of the FR flag from "1" to "0" is used as a reference to determine whether the subcode area data corresponds to video and audio data previously read or whether the subcode area data corresponds to video and audio data subsequently read.

Another advantage of the FR flag is to determine whether a reproduced signal was recorded according to the NTSC system or according to the PAL system. Because the tracks of the recorded signal are alternately read by two in-azimuth heads, when a frame is recorded according to the PAL system, wherein one frame is composed of 12 tracks, the first track of the last-half of the frame is read by the same head that read the first track of the frame. In contrast, when a frame is recorded according to the NTSC system, wherein one frame is composed of 10 tracks, the head that reads the first track of the last half of the frame is not the same head that read the first track of the frame. Accordingly, by detecting the first track of the frame using the transition of the FR flag and noting which of the two heads read the track, and by detecting an initial track of the last-half of the frame using the transition of the FR flag and by noting whether the head used at that time, it is possible to determine whether the signal is recorded according to the NTSC system or according to the PAL system.

Figure 25:
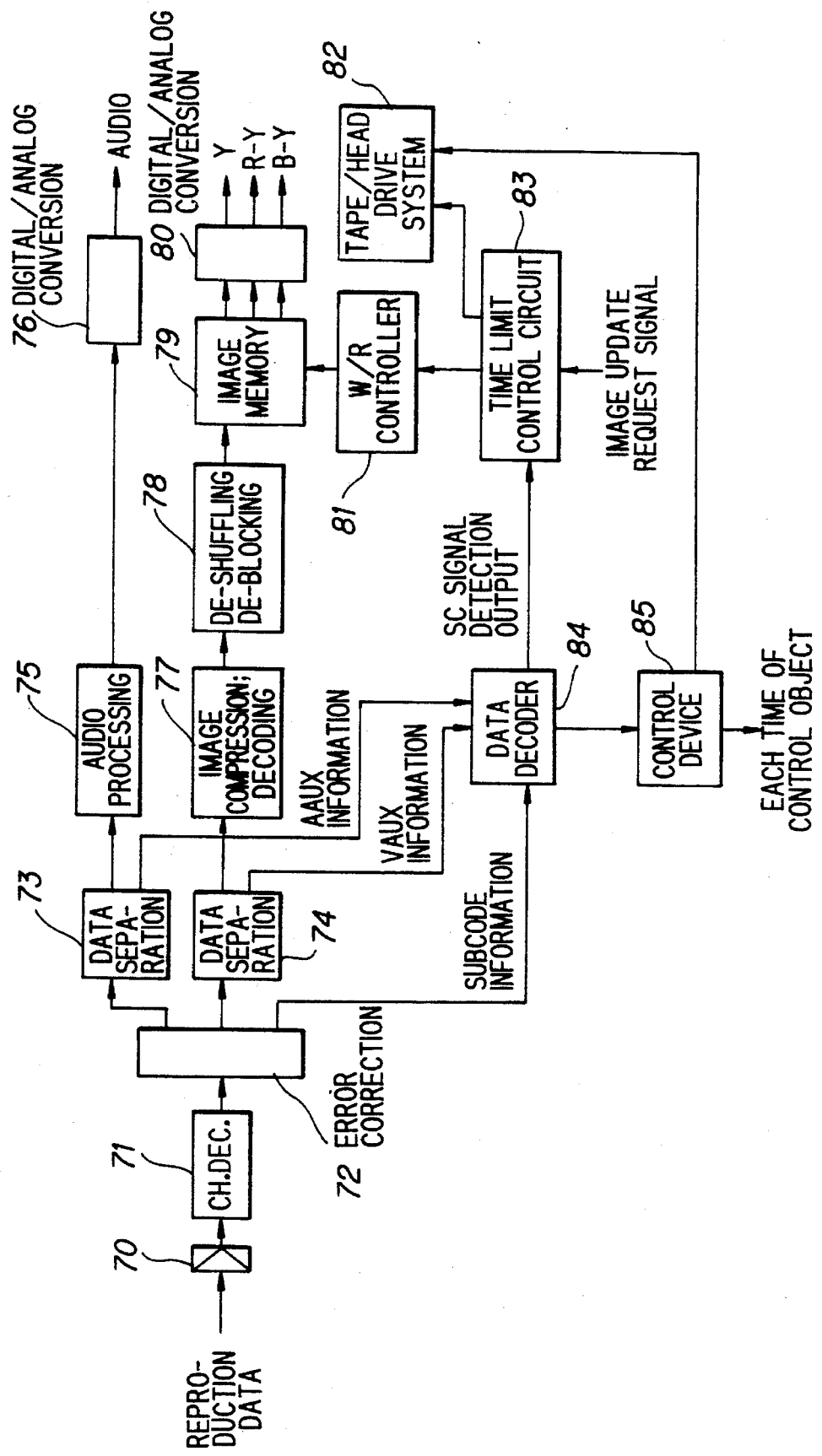
FIG. 25 is a block diagram showing an embodiment of a reproduction and auto-switching circuit of the present invention.

FIG. 25 is a block diagram of a reproducing side of a digital VTR according to an embodiment of the present invention. As shown in FIG. 25, signals reproduced by a reproducing head are supplied to an error correcting circuit 72 via a reproducing amplifier 70 and then through a channel decoder 71. The error correcting circuit 72 error corrects the reproduced signals and separates the signals into the above-described audio, video, and subcode areas. The error correcting circuit 72 supplies audio area signals to a data separating circuit 73 in which the audio area signals are divided into audio data and into AAUX data. The data separating circuit 73 supplies the audio data to an audio processing circuit 75 which further processes the audio data and supplies the audio data to D/A conversion circuit 76 for output as an analog audio signal.

The error correction circuit 72 supplies the video area data to a data separating circuit 74 in which the data is divided into video data and into VAUX data. The data separating circuit 74 supplies the video data to an image compression decoding circuit 77 which decompresses and then supplies the decompressed video data to a de-shuffling/de-blocking circuit 78. The de-shuffling/de-blocking circuit supplies the de-shuffled video data to an image memory 79 for storage. The stored data is read out from the image memory 79 and supplied to a D/A conversion circuit 80 which converts the analog data signal to an analog Y signal, R-Y signal, and B-Y signal. The analog signals are supplied to a display device where a reproduced image is displayed.

The error correcting circuit 72 supplies the subcode data to a data decoder 84. The data separating circuits 73 and 74 respectively supply the AAUX and VAUX data to the data decoder 84. The data decoder 84 decodes information from the subcode, AAUX and VAUX data and supplies the decoded information to a control device 85 in which various controlling operations are performed which include operations based on the TAG code data stored in the subcode data and operations which display the character data stored in the AAUX or VAUX data.

The data decoder 84 also supplies an SC signal to a time limit control circuit 83 which delivers a tape travel control signal to tape/head drive system 82 to control operation of the tape and tape head during high speed cuing and during reproduction of recorded moving images and still images, as is described below.

The data decoder 84 also supplies a write inhibit signal to write/read controller 81 to control the writing-in and reading-out of images from image memory 79 during the search and reproduction.

Figure 26:
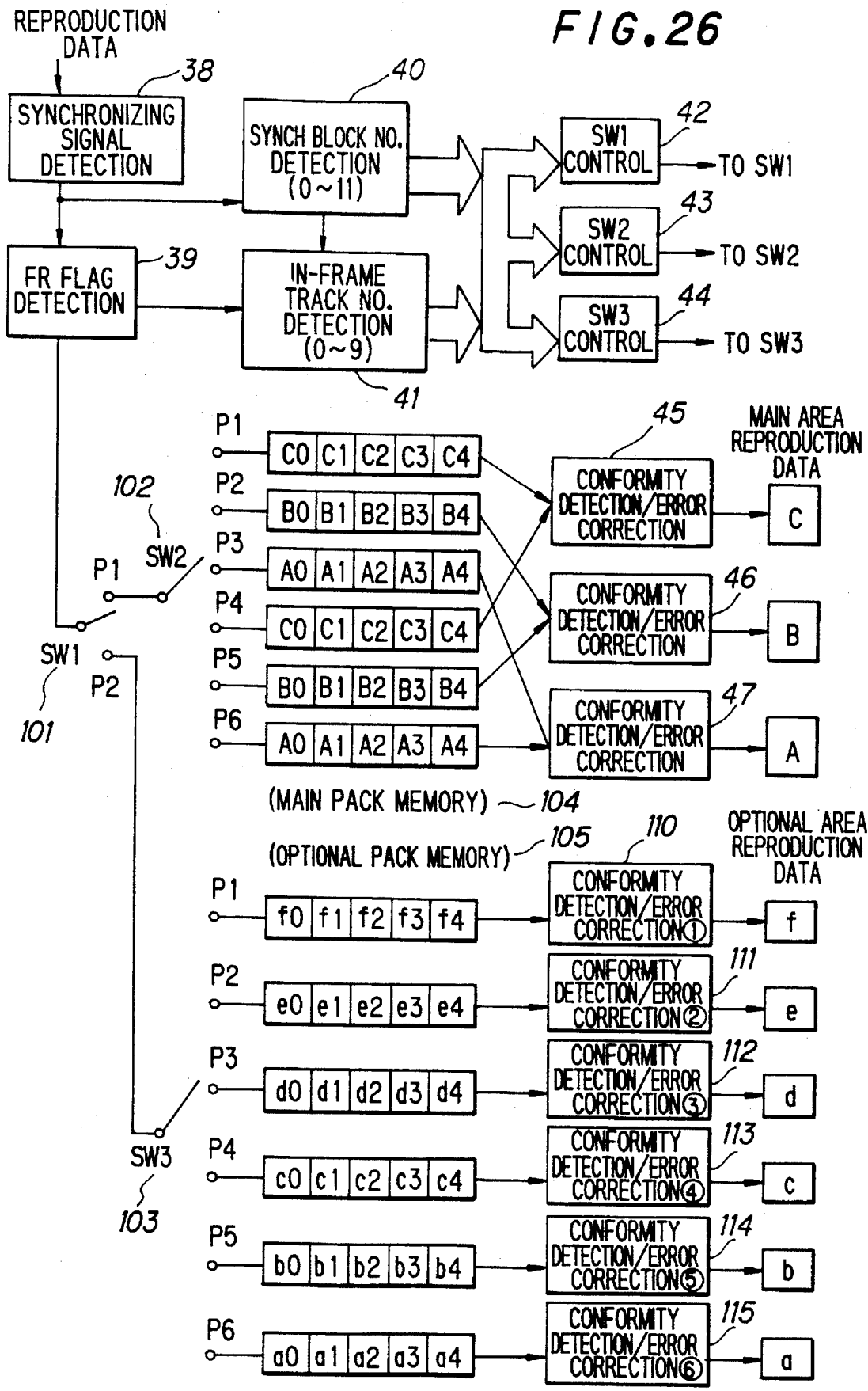
FIG. 26 is a block diagram showing an embodiment of the subcode data reproducing circuit of the reproduction circuit of FIG. 25.

FIG. 26 is a block diagram of an embodiment of a subcode data reproducing circuit of the error correction circuit 74 shown in FIG. 25.

As FIG. 26 shows, a reproduced subcode area signal is supplied to a synchronizing signal detecting circuit 38. The circuit 38 delivers a portion of the subcode area to a detecting circuit 40 which detects a SYNC-block number from the ID1 section of the subcode area signal and delivers the sync block number to an in-frame track number detector 40 and to switch controllers 42, 43 and 44.

The detector 38 also supplies the subcode signal to an FR flag data detecting circuit 39 which determines the first track of each frame from the FR flag and delivers a signal to an in-frame track number counter 41. The in-frame track number counter 41 counts each time a predetermined SYNC-block number, such as "0", is detected as a function of the output signal of the detecting circuit 40. The counter 41 is also reset at the start of each frame as a function of the output signal of the FR flag detecting circuit 39 and delivers a track number signal to switch controllers 42, 43 and 44.

The detecting circuit 39 delivers the subcode area signal to switch 101. The switch 101 is switched under the control of the switch control circuit 42 as a function of the sync block number of a frame, as shown in FIG. 27A, such that the subcode area signals are sorted into main data packs and optional data packs. The switch 102 is controlled by the switch control circuit 43 as a function of the sync block number, as shown in FIG. 27B, such that only data of the same type of pack are delivered to one of terminals P1 to P6 of main pack memory 104 and stored in the corresponding memory. The switch 103 is controlled by switch control circuit 44 and is switched based on the SYNC-block number and the odd/even track number, as shown in FIG. 27C, such that only data of the same type of pack is delivered to one of terminals Pa to P6 of an optional pack memory 105 and are stored in the respective memory.

The memory 104 and 105 deliver the stored data packs to a respective one of conformity-detecting/error-correcting circuits 45 to 47 and 110 to 115 for selection of the correct pack data using a majority judgment. Each of corresponding circuits 45 to 47 majority judges ten main data packs and each of circuits 110 to 115 majority judges five corresponding optional data packs. As an example, main data packs A0 to A4 from P3 and A0 to A4 from P6 are subjected to majority judgment processing to determine the reproduction data pack A. It is to be noted that in a tape wherein the packs A and C store the same TTC data, majority judgment is performed on twenty packs.

An example of the operation of the majority judgment method is now explained with reference to FIG. 28.

Figure 28:
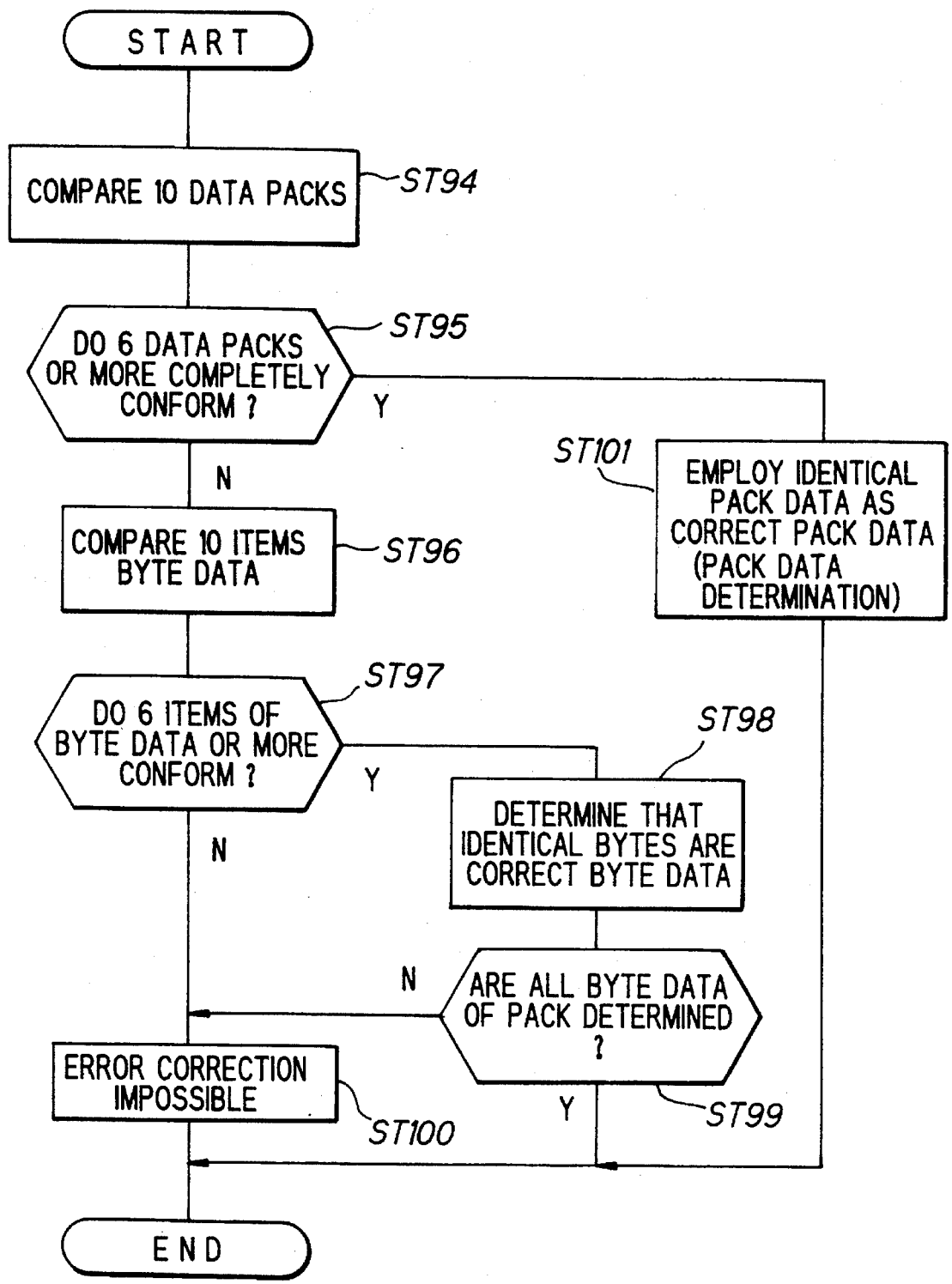
FIG. 28 is a flow chart referred to in explaining the majority judgment operation of the subcode signal reproducing circuit of FIG. 26.

FIG. 28 illustrates majority judgment of ten reproduced main data packs. In step ST 94, the 5 bytes of data of the ten packs of the same type of data are compared. When the 5 bytes of data in each of at least six or more packs are identical, the data is determined to be correct (ST 95 and ST 101). When the number of identical packs is five packs or less, the ten packs are then compared in units according to each byte (ST 96). When at least six packs store an identical byte, the respective byte is determined to be correct (ST 98 and ST 99). When any one byte of the 5-bytes of data is not identical in at least six of the packs, the pack is discarded as unable to undergo error correction (ST 100) or, alternatively, the correct pack data is determined by majority judgment of the respective bits.

Majority judgment processing for the optional data packs is performed in a similar manner by requiring that at least three packs be identical.

Figure 29:
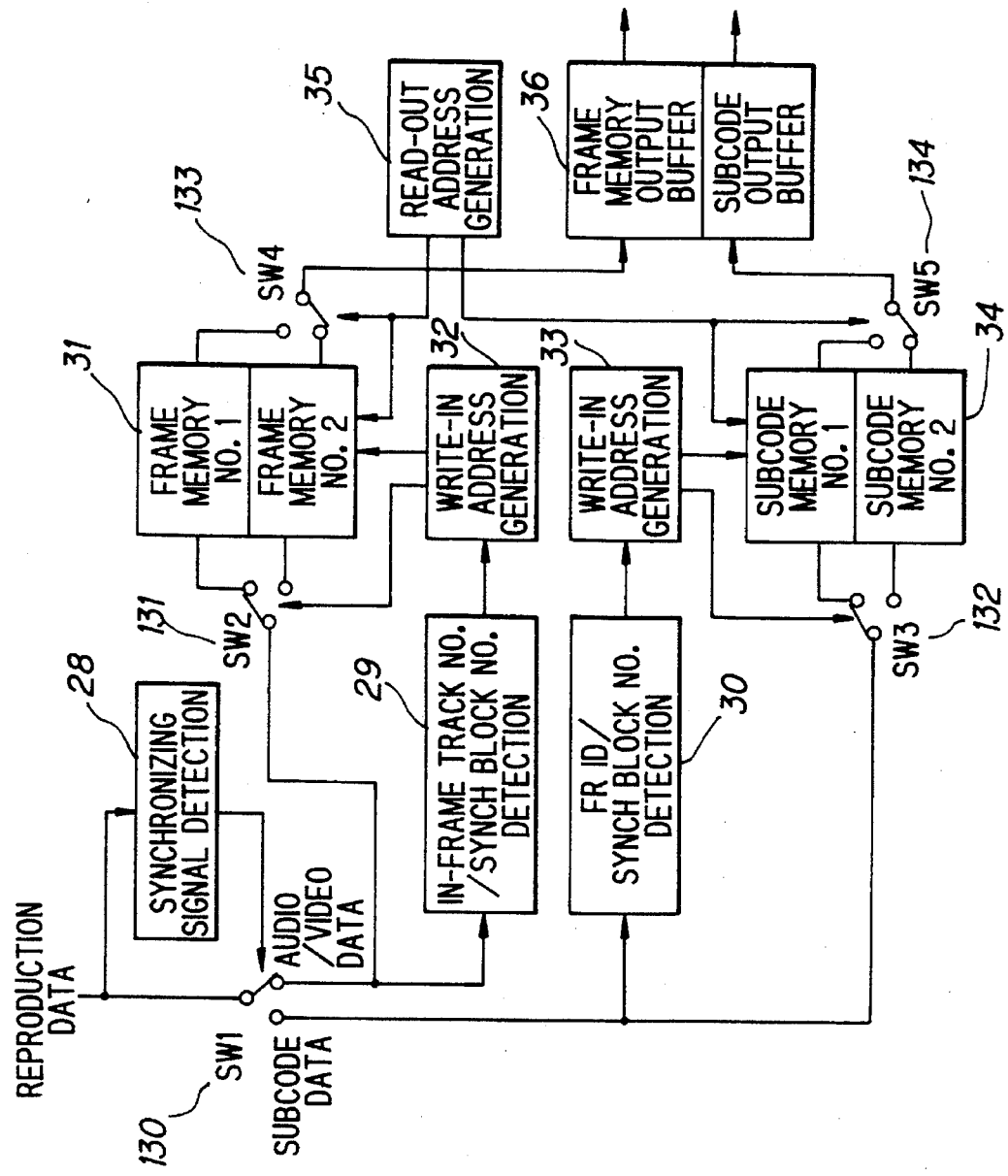
FIG. 29 is a block diagram showing an embodiment of a correcting circuit for variable tape speed reproduction of FIG. 24.

FIG. 29 shows an embodiment of a correcting circuit of the error correction circuit of FIG. 25 that operates to synchronize reproduced audio and video signals with reproduced subcode area signals during the variable speed reproduction shown in FIG. 24.

As shown in FIG. 29, reproduced data which has been read by a reproducing head and channel decoded by channel decoder 71 is supplied to a synchronizing signal detector circuit 28 in error correction circuit 72 of FIG. 25. The detector circuit 28 controls a change-over switch 130 as a function of the sync signals stored in the preamble sections of the audio, video and subcode areas to separate the audio, video and subcode data.

The switch 130 delivers the audio/video data to a storage frame memory circuit 31 and to a detection circuit 29. The detection circuit 29 detects an in-frame track number and a SYNC block number as a function of the ID section of the audio area and the video area and determines a write address for the storage circuit 31.

The storage circuit 31 is comprised of two frame memories, No. 1 and No. 2, which are selected as a function of the write address.

The switch 130 delivers the subcode area data to a subcode memory storage circuit 34 and to a detection circuit 30. The storage circuit 34 is comprised of two subcode memories, No. 1 and No. 2, each having a storage capacity of one frame of subcode data. The detection circuit 30 determines a write address for each subcode memory of the storage circuit 34 as a function of the FR flag and SYNC block number stored in the subcode area and delivers the write address to the storage circuit 34. The detection circuit 30 also detects the start of a frame by the change in value of the FR flag from "1" to "0" and controls the switch 132 so that the subcode area data of the succeeding frame is not delivered to the same subcode memory as the data of the preceding frame. The possibility of subcode area data corresponding to two frames being stored in one subcode memory is thus eliminated.

A reading-address generating circuit 35 supplies reference address signals to storage circuits 31 and 34. The audio/video data and the subcode data area are read out from the selected memories of the storage circuits 31 and 34 and supplied to a buffer circuit 36 such that the audio/video data and subcode data of the same frame are read out together.

The above-described recording circuit shown in FIG. 2 and reproducing circuit shown in FIG. 25 respectively designate and search for moving pictures and still pictures recorded on a recording medium using various types of searching ID signals that are stored using the above-described format. This designation and search method is now explained.

The present invention records, searches for and reproduces four types of still pictures, in addition to conventional moving pictures, as is now described.

In snap-photographic recording, one-frame images are repeatedly recorded on a tape for a several seconds. The picture signal is recorded under the same operational conditions as in ordinary moving pictures. Audio signals also are similarly recorded.

In strobo-photographic recording, a one-frame image signal is extracted from one of several consecutive moving image frames and the extracted frame image signal is repeatedly recorded on a tape until the next image signal is extracted. Recording is performed under the same operational conditions as in ordinary moving-image recording. During reproduction, the strobo-photographic still image is displayed using the same reproduction operation as in ordinary moving pictures. Audio data are also similarly recorded and reproduced.

In single-photographic recording, a one-frame image is repeatedly recorded a predetermined number of times. A digital VTR is used in a manner similar to a "still camera". During reproduction, a reproducing signal that is stored once in a picture memory is repeatedly read out to display the still picture, and tape travel is stopped.

In single-photographic continuous recording, a number of single photographic recordings are performed continuously. Different still pictures are continuously recorded.

The four types of still pictures, as well as moving pictures, are designated and searched using the above mentioned PP ID, FC, ST, SC, and INDEX ID code signals. The function of the signals are now explained.

Figure 30A:
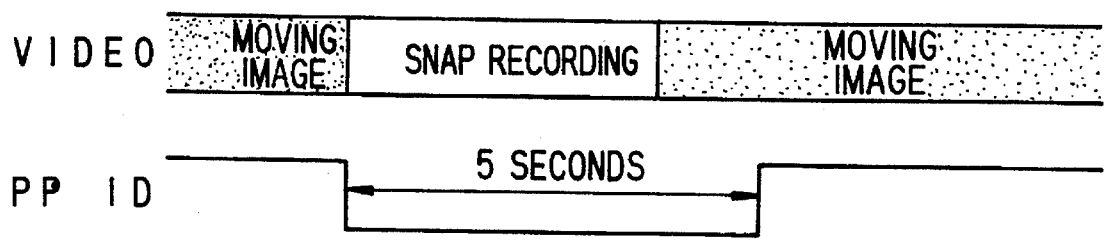
FIGS. 30A–30C are diagrams illustrating the timing of the PP ID signal.

The PP ID (Photo/Picture ID) signal is recorded in the TAG section of the subcode area shown in FIG. 16 when a still image is recorded and indicates the range on the tape in which the still pictures are recorded. The PP ID signal is recorded for at least five seconds. When the still image, such as the snap-photographic recording shown in FIG. 30A, is recorded for less than five seconds, the recording of the PP ID signal continues into a portion of the succeeding moving-image.

Figure 30B:
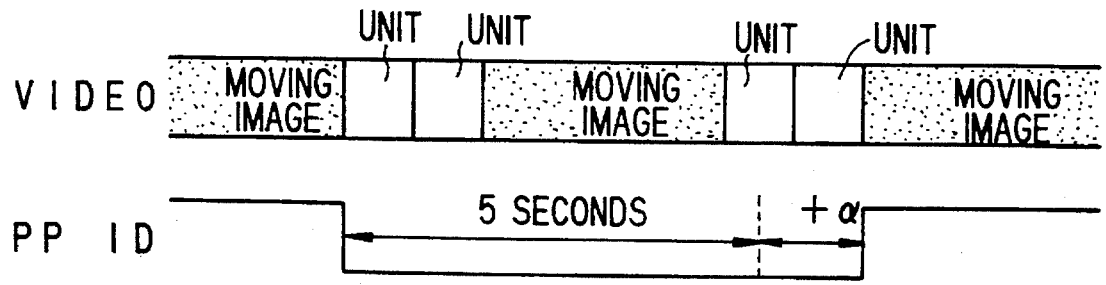
Figure 30C:
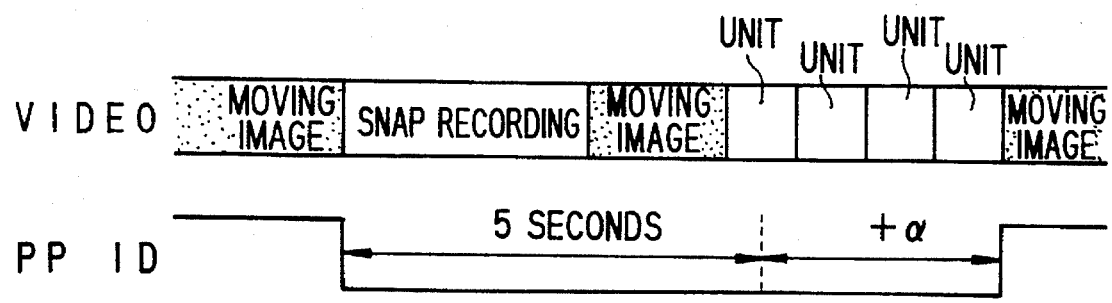

When the still picture recording time period exceeds five seconds, the PP ID signal is recorded until still picture recording is terminated, as shown in FIGS. 30B and 30C. Further, if a moving-image is recorded during the five-second period of the PP ID signal, the recording of the PP ID is not affected.

The PP ID signal is recorded for at least 5 seconds so that a still picture recording can be located using high-speed searching.

Figure 31A:
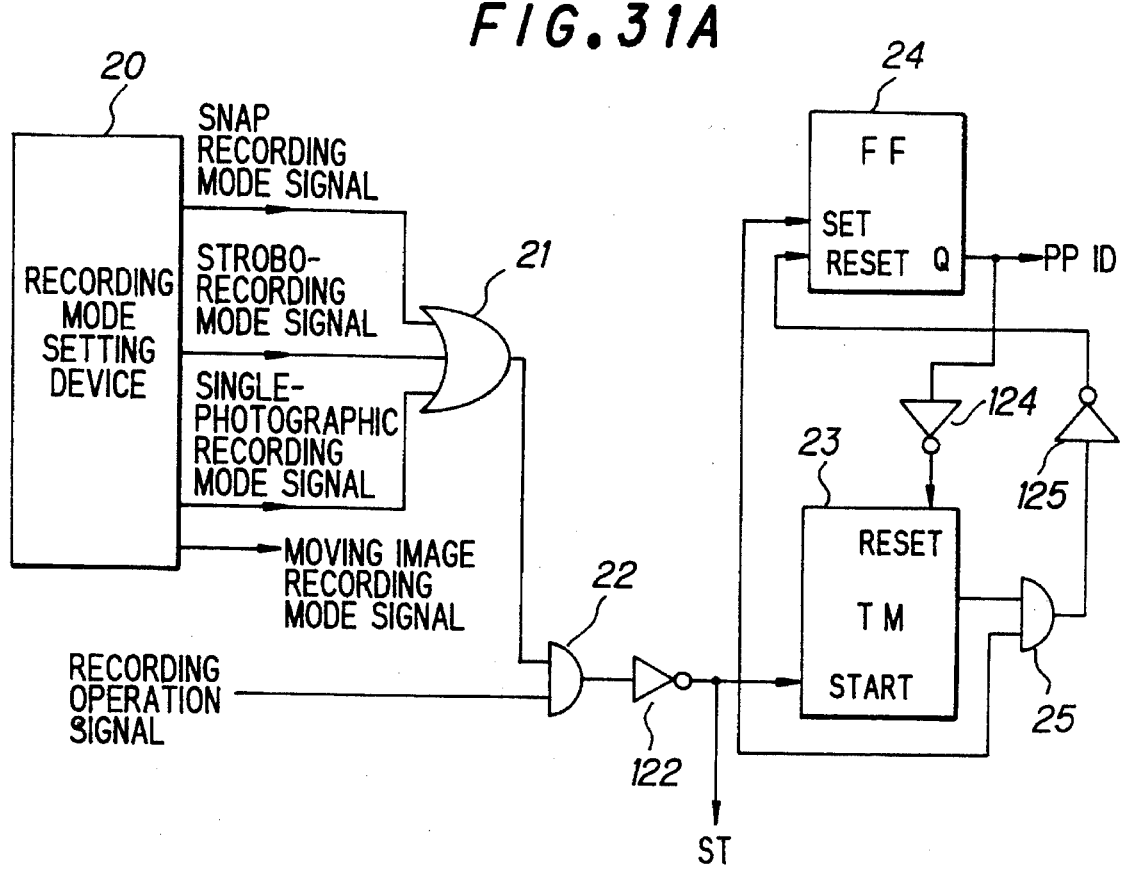
FIGS. 31A–31C are block diagrams respectively showing embodiments of a PP ID signal generating circuit, and FC signal generating circuit and a SC signal generating circuit.

FIG. 31A illustrates an embodiment of a circuit for generating the PP ID signal. A recording-mode setting device 20 delivers one of a snap-photographic recording mode signal, a strobe-photographic recording mode signal, and a single-photographic recording mode signal in a HIGH state to start recording of the picture. The setting device 20 also delivers the signal to AND circuit 22. At this time, the level of the recording operation signal is also HIGH and is delivered to AND circuit 22. The AND circuit 22 supplies a HIGH level to invertor circuit 122 which sets a flip-flop (FF) circuit 24 such that an output signal supplied from the PP ID output terminal changes from HIGH to LOW. The invertor 122 also delivers a LOW signal to a five-second timer 23 which starts counting.

While the timer 23 is counting, the timer 23 delivers a "LOW" output to AND circuit 25, which causes an invertor 125 to deliver a HIGH input to a reset input of flip-flop 24.

When the timer 23 has counted five seconds, the timer 23 delivers a HIGH level to the AND circuit 25. When the recording of still pictures end, AND circuit 22 outputs a LOW. As a result, the AND circuit 25 outputs a HIGH to invertor 125 which delivers a LOW to the reset input of flip-flop 24. The FF 24 is thus reset and outputs a PP ID signal having a HIGH level. The FF circuit 24 also resets timer 23 for the next still picture recording.

The FC (Frame Change) signal is recorded in the VAUX SOURCE CONTROL pack shown in FIG. 14(2) and indicates whether or not the image of a present frame is identical to that of an immediately preceding frame. If the images are identical, the FC code has a value of "0", whereas if the images are different, the value of the FC code is "1". Thus, as shown in FIGS. 32 and 33, the FC code has a value of "1" during a moving image recording and during the initial frame of a still picture recording and has a value of "0" during the remainder of still picture recording.

Figure 31B:
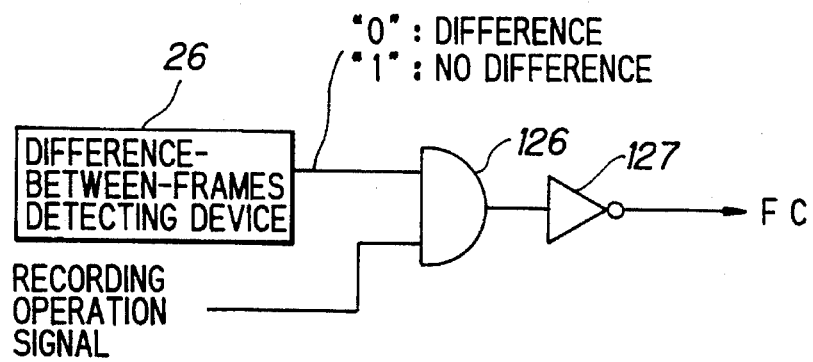

FIG. 31B shows an FC signal generating circuit constructed using an inter-frame difference zone detecting device 26 to generate a signal as a function of the difference between adjacent frames.

The ST (Still Picture) signal is recorded in the same VAUX SOURCE CONTROL as the FC code signal shown in FIG. 14(2) and indicates whether the recorded picture is a still picture (namely a snap-recording, a strobo-recording, a single-photographic recording, or a single-photographic continuous recording) or is a moving picture. A "0" is stored during a still picture recording, whereas a "1" is stored during a moving picture recording, as shown in FIGS. 32 and 33.

The PP ID generating circuit shown in FIG. 31A generates an ST code signal from the output of invertor circuit 122.

The SC (Still Camera) signal is also recorded in the above-described VAUX SOURCE CONTROL pack of FIG. 14(2). The SC code signal has a value of "0" for a recorded still picture that is reproduced with the reproducing apparatus temporarily stopped, whereas the SC code has a value of "1" for a recorded tape portion that is reproduced normally. Thus, the SC code signal only has a value of "0" for single-photographic continuous recordings as shown in FIGS. 32 and 33.

Figure 31C:
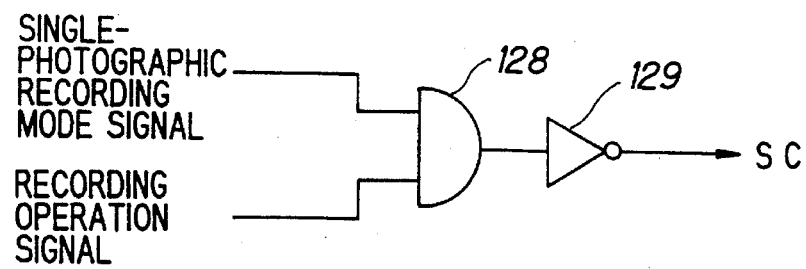

FIG. 31C illustrates an SC generating circuit which operates as a function of the single photographic mode recording signal and the recording operation signal.

The PPID, FC, ST and SC signals are all automatically recorded during the recording of the still or moving pictures. The INDEX ID signal is recorded on the TAG code zone in the subcode area shown in FIG. 16 and is after-recorded when designating a portion of a moving picture or when designating a still picture for cuing. The INDEX ID signal is recordable over a variable time period so that it can be recorded for a short period of time to designate a still picture.

The designation of pictures and the search for the designated pictures using the above-described ID signals are now explained.

FIG. 29 illustrates an example of a snap-photographic recorded image and two adjacent images of a single- photographic recording are designated by after-recording the INDEX ID signal. The after-recording time period of the INDEX ID in this example is shorter than an INDEX ID which is used for conventional cuing designation of a moving image. Therefore, this shorter INDEX ID signal is usually not detected by a convention INDEX ID search for cuing a moving image.

In FIG. 30, an example of four strobo-recordings and four single-photographic recordings are included within the still picture recording time periods. In this example, the third strobo-recording and the second and the fourth single-photographic recording are designated by after-recording the INDEX ID signal.

FIG. 34 illustrates the designation of specific frame in a moving image recording. In this example, no PP ID signal is initially recorded in the moving-image portion, and the desired frame image is designated by after-recording the PP ID signal for a period of five seconds from the designated frame and after-recording the INDEX ID signal.

If another frame is also designated within the range of the PP ID signal, only the INDEX ID signal is recorded, as shown by B of FIG. 34.

Additionally, if a conventional five second INDEX ID signal for searching a moving image is previously recorded at the same location where a frame image portion is to be designated, the conventional INDEX ID signal can be erased and the PP ID and INDEX ID signals after-recorded at the desired image frame portion, as shown in FIG. 34.

Figure 35:
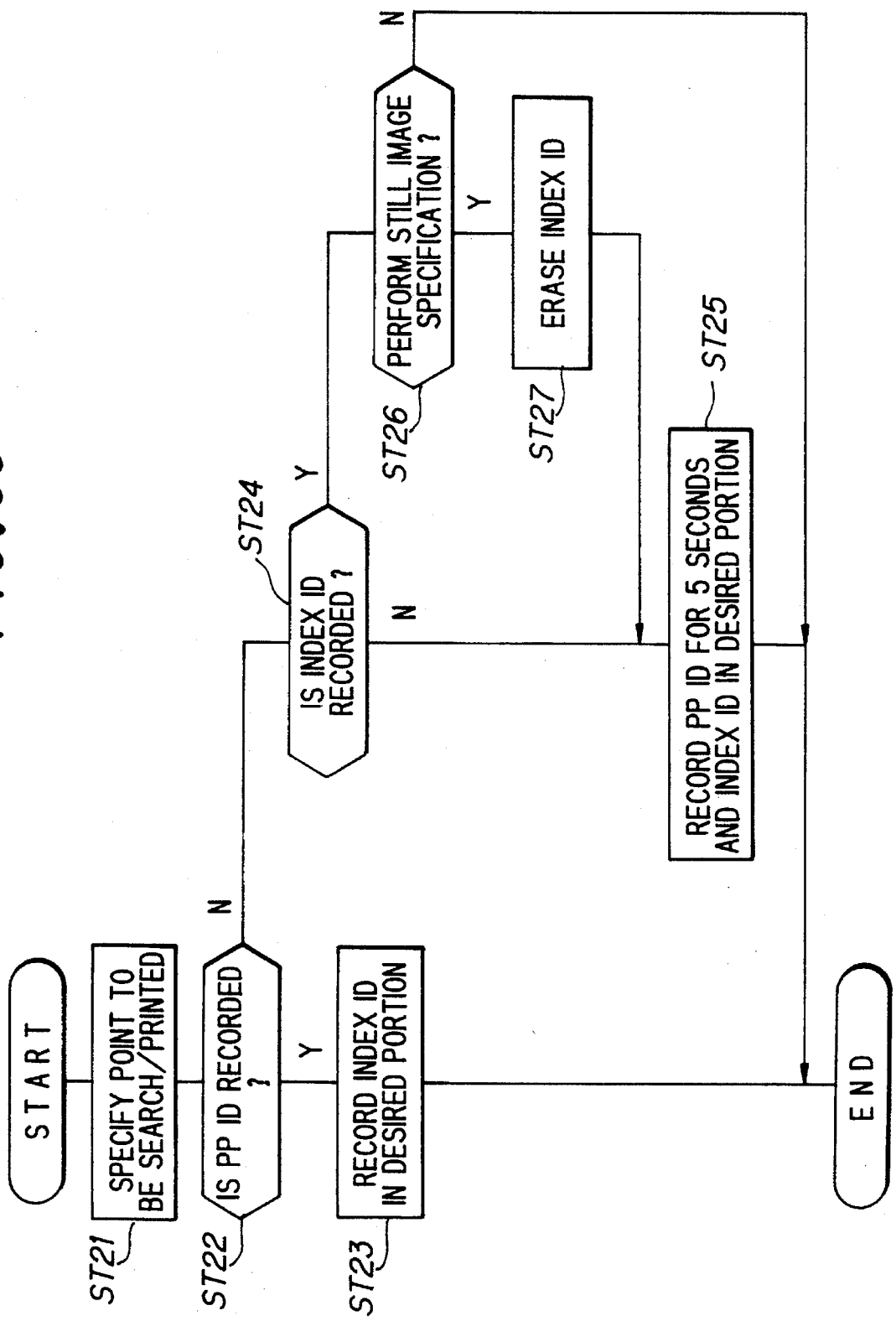
FIG. 35 is a flow chart referred to in explaining the operation of designating a still picture.

The operation of designating a still picture is shown in FIG. 35. As shown in step ST 21, a user selects a desired still picture portion to be searched or printed while viewing a reproduced-image screen and instructs a controller, such as a microcomputer, to designate the selected still picture. The controller, upon receipt of this instruction, determines whether a PP ID signal is recorded at the selected still picture portion (ST 22). If a PP ID signal was previously recorded, an INDEX ID signal is after-recorded at the specified still picture portion (ST 23). If no PP ID signal was recorded, the controller determines whether an INDEX ID signal was previously recorded at the selected still picture portion (ST 24). If no INDEX ID was recorded, the PP ID and INDEX ID signals are after-recorded (ST 25).

An INDEX ID signal detected at step ST 24 indicates that a conventional moving-image search INDEX ID signal is recorded at this image portion. The user is then asked whether to erase the conventional moving-image search INDEX ID signal and after-record a designation of the still picture (ST 26). If the answer is YES, the recorded conventional INDEX ID signal is erased and PP ID and INDEX ID signals are after-recorded (ST 25 and ST 27).

Figure 36:
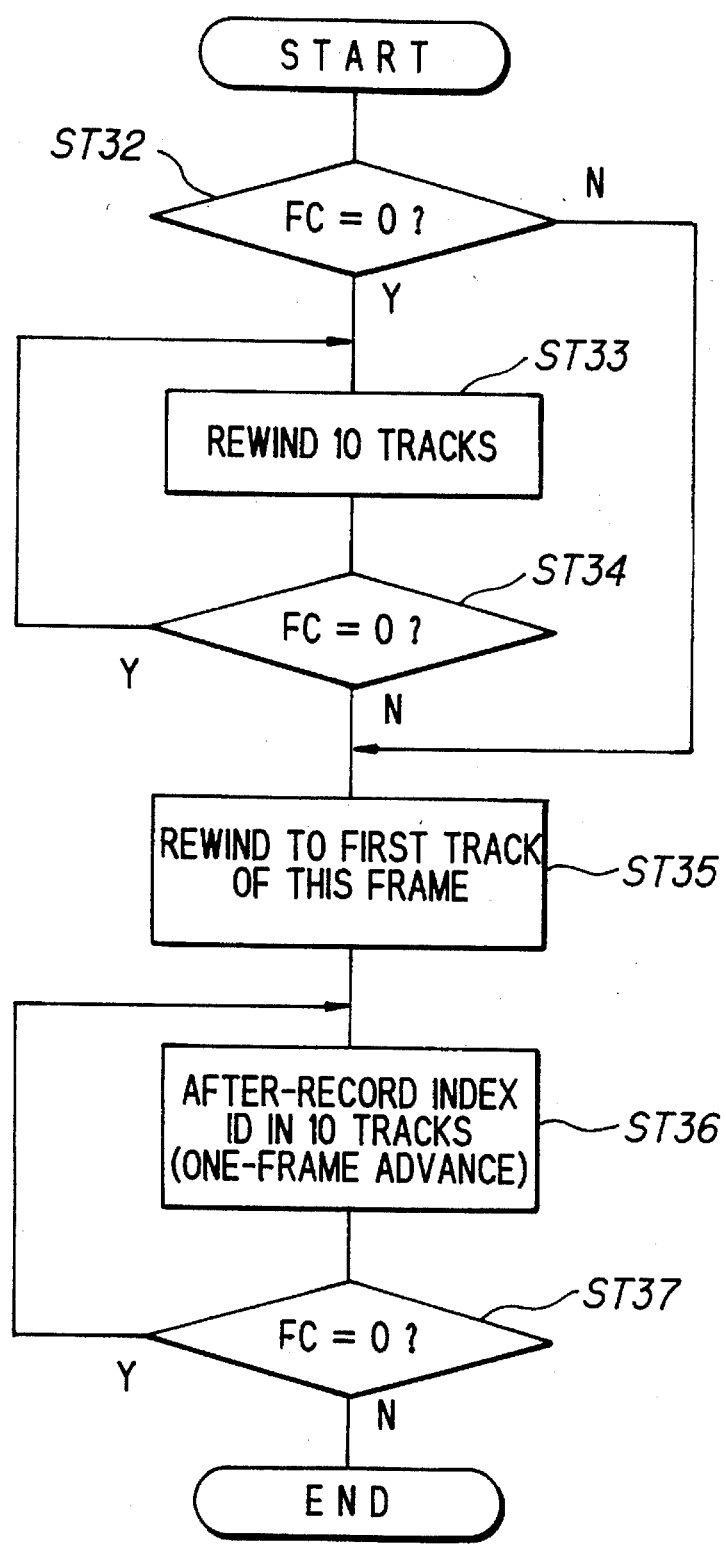
FIG. 36 is a flow chart referred to in the operation of recording the INDEX ID of FIG. 35.

FIG. 36 illustrates in greater detail the operation of the INDEX ID after-recording steps ST 22 and ST 25 shown in FIG. 35.

As shown at step ST 32, it is determined whether the FC code signal is at the selected image. If FC≠0, the selected frame is the initial frame of snap-recording, single-photographic recording, or strobo-recording shown in FIGS. 32 and 33, and operation jumps to Step ST35. If FC=0, the tape is rewound ten tracks at a time (ST 33) until a frame having an FC value of "1", namely an initial frame in the still picture recording, is reached (ST 34).

As shown at steps ST 35, the tape is rewound until the first track of the initial still picture frame is reached and the INDEX ID signal is recorded in units of 10 tracks (ST 36). The INDEX ID signal is recorded until the frame immediately preceding a frame having an FC value of "1" (ST 36 and ST 37), namely until the first frame of the succeeding still picture or moving image.

Figure 37:
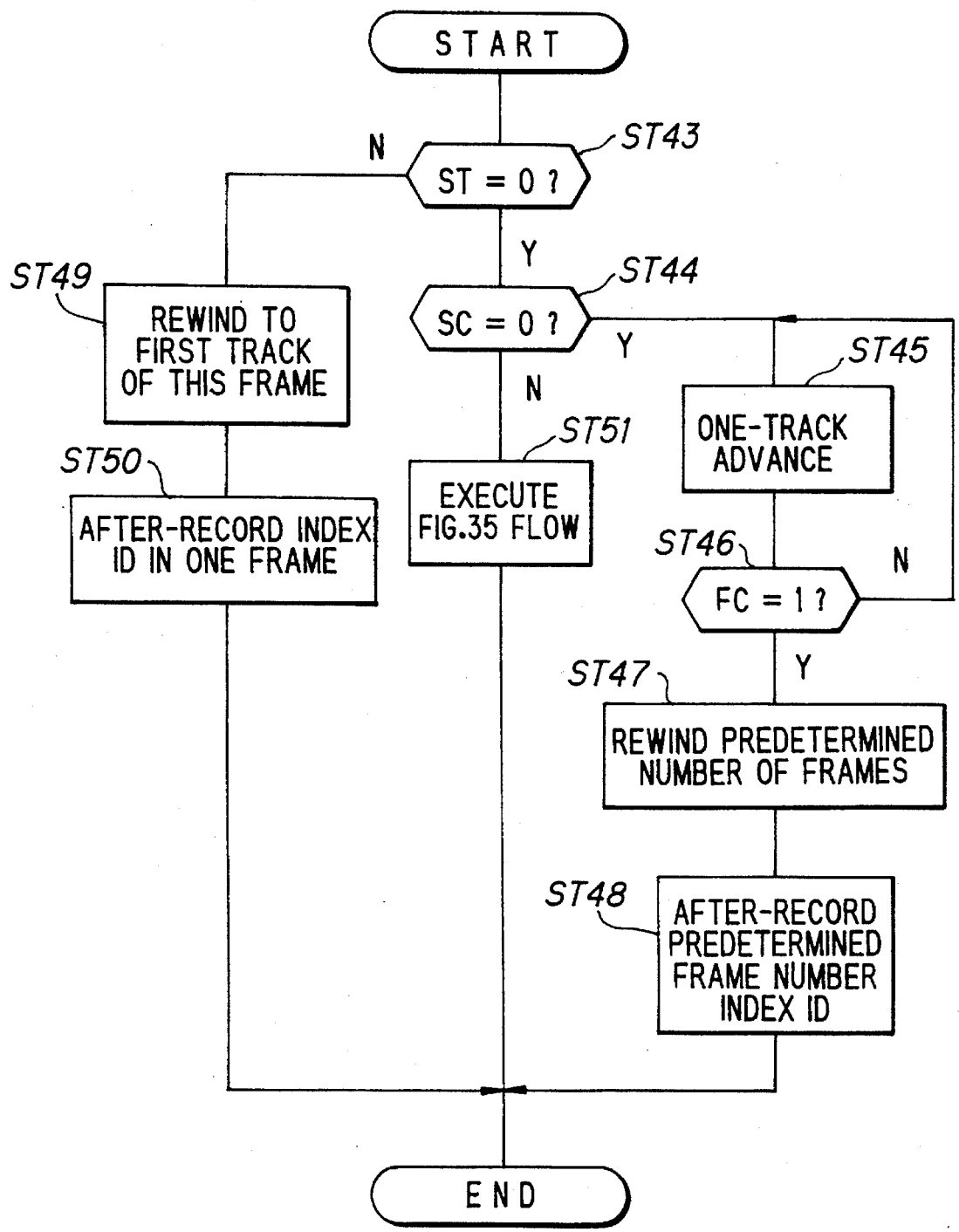
FIG. 37 is a flow chart referred to in explaining the operation of recording an INDEX ID signal as a function of other data signals.

Alternatively, the determination of whether the selected picture is within a moving image recording can be based on the ST code signal. Also, the determination of whether a still picture is within the single-photographic recording can be based on the SC code signal. FIG. 37 illustrates the operation of after-recording an INDEX ID using the ST and SC signals.

As shown at steps ST 43, if FC≠0, the selected picture is within a moving image recording, and the tape is rewound up to the first track of the selected frame and an INDEX ID signal after-recorded for a period of one frame (ST 49 and ST 50).

If FC=0, namely the selected image is a still picture recording, it is determined whether the still picture recording is a single-photographic recording. If SC=0, the tape is advanced one track at a time until the end of the single-photographic recording wherein the value of the FC code signal changes from "0" to "1" (ST 45 and ST 46). The tape is then rewound by a predetermined number of frames corresponding to one single-photographic recording to the start of the single-photographic recording, and an INDEX ID signal is after-recorded by the number of the frames corresponding to the single-photographic recording (ST 47 and ST 48).

If SC≠0 (ST 44), namely the selected picture is within a snap-photographic recording or within a strobo-photographic portion, the operation of FIG. 35 is executed to after-record an INDEX ID signal (ST 51).

Figure 38:
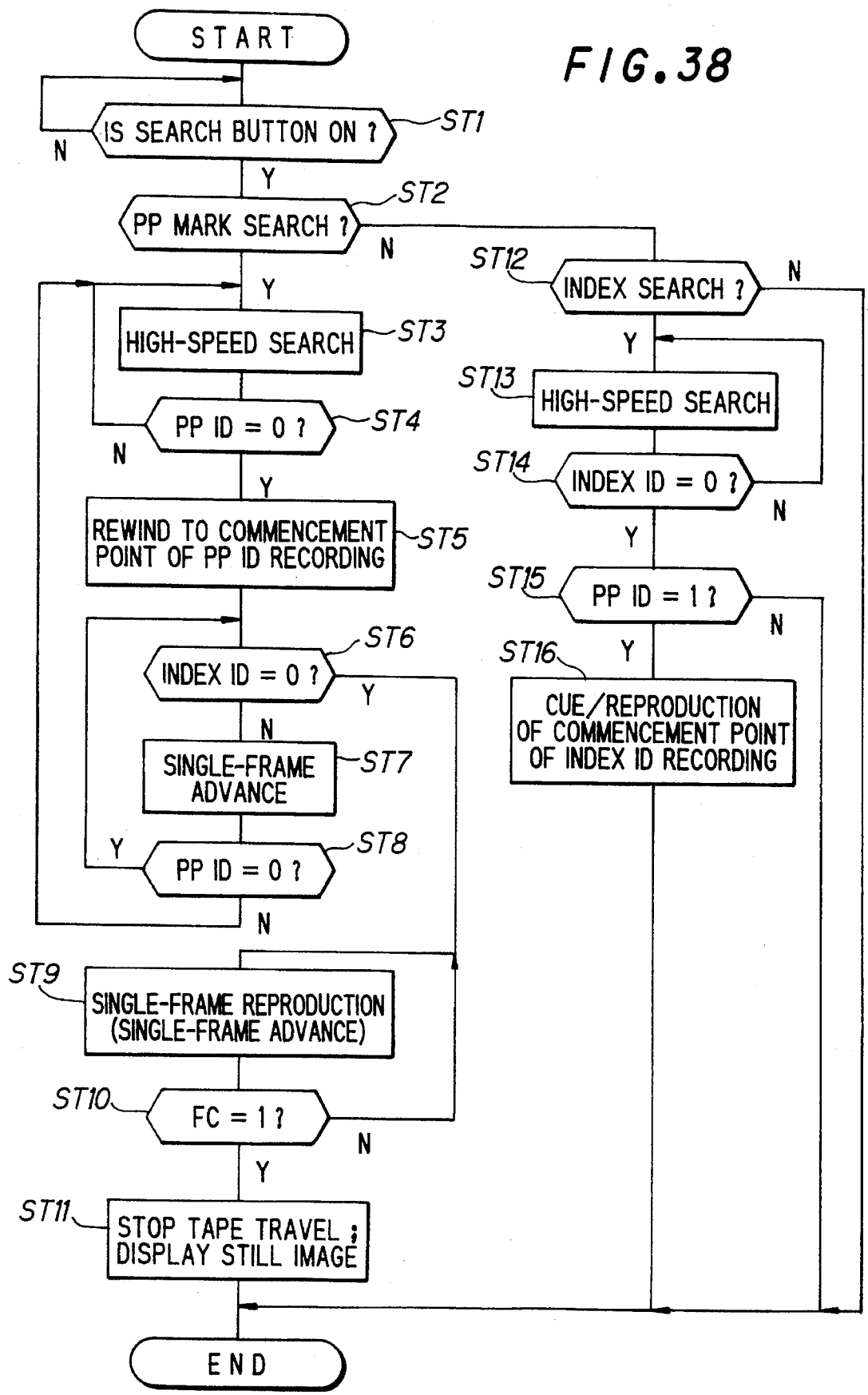
FIG. 38 is a flow chart referred to in explaining the operation of a forward picture search.

FIG. 38 illustrates the operation of searching for a designated still picture or moving image portion as a function of the recorded PP ID and INDEX ID using the recorded image reproducing apparatus shown in FIG. 25. This still picture searching method is referred to as a "PP MARK Search".

As shown in step ST 1, the presence of a search request signal is determined. If a search request signal has been generated, it is determined whether the requested search is a PP MARK search (ST 2). If a PP MARK search is requested, the tape is fast forwarded to a location where a PP ID signal is recorded (ST 3 and ST 4), namely at a still picture recording. The tape speed is reduced and the tape rewound to the start of the recorded PP ID signal, i.e., the start of the still picture (ST 5). The tape is then advanced one frame at a time until an INDEX ID signal is detected, namely the desired still picture (ST 6 to ST 8). After the location of the desired still picture is reached, this still picture is reproduced from the tape and the tape advanced one frame at a time to the position where the still picture recording terminates, whereat the value of the FC code signal changes to "1" (ST 9 and ST 10). The reproduced frame is written into an image memory, such as the image memory 74 shown in FIG. 25.

When the termination of the still picture recording is reached, the tape is stopped, and the still picture is repeatedly read out from memory to a display device (ST 11).

If no INDEX ID signal is detected in the still picture recording (ST 6 to ST 8), the high-speed searching step (ST 3) is resumed to search for the next still picture recording.

If the requested search is not a PP MARK search (ST 2), it is determined whether the search request is a conventional moving-image INDEX search request (ST 12). If such a search is requested, the subcode area is searched at high speed to find a tape portion in which an INDEX ID signal is recorded (ST 13 and ST 14). If this tape portion is found, it is determined whether a PP ID signal is after-recorded therein (ST 15). If no PP ID signal is recorded (namely, if PP ID=1), the tape is rewound to the start of the INDEX ID signal and image reproduction commenced (ST 16).

If a PP ID signal (PP=0) is recorded (ST 15), the tape portion stores a still picture and not a moving image, and image reproduction operation is not performed.

If a conventional moving-image INDEX search is not requested (ST 12), an alternative search (such as a search for a recording time and date) is executed.

The above-described operation searches for a still picture in which an INDEX ID signal is after-recorded. If, after a search, the displayed still picture is not coincident with the image the user has designated by the INDEX ID, the next still picture must be searched. The operation of such a "NEXT search" is explained with reference to FIG. 39.

Figure 39:
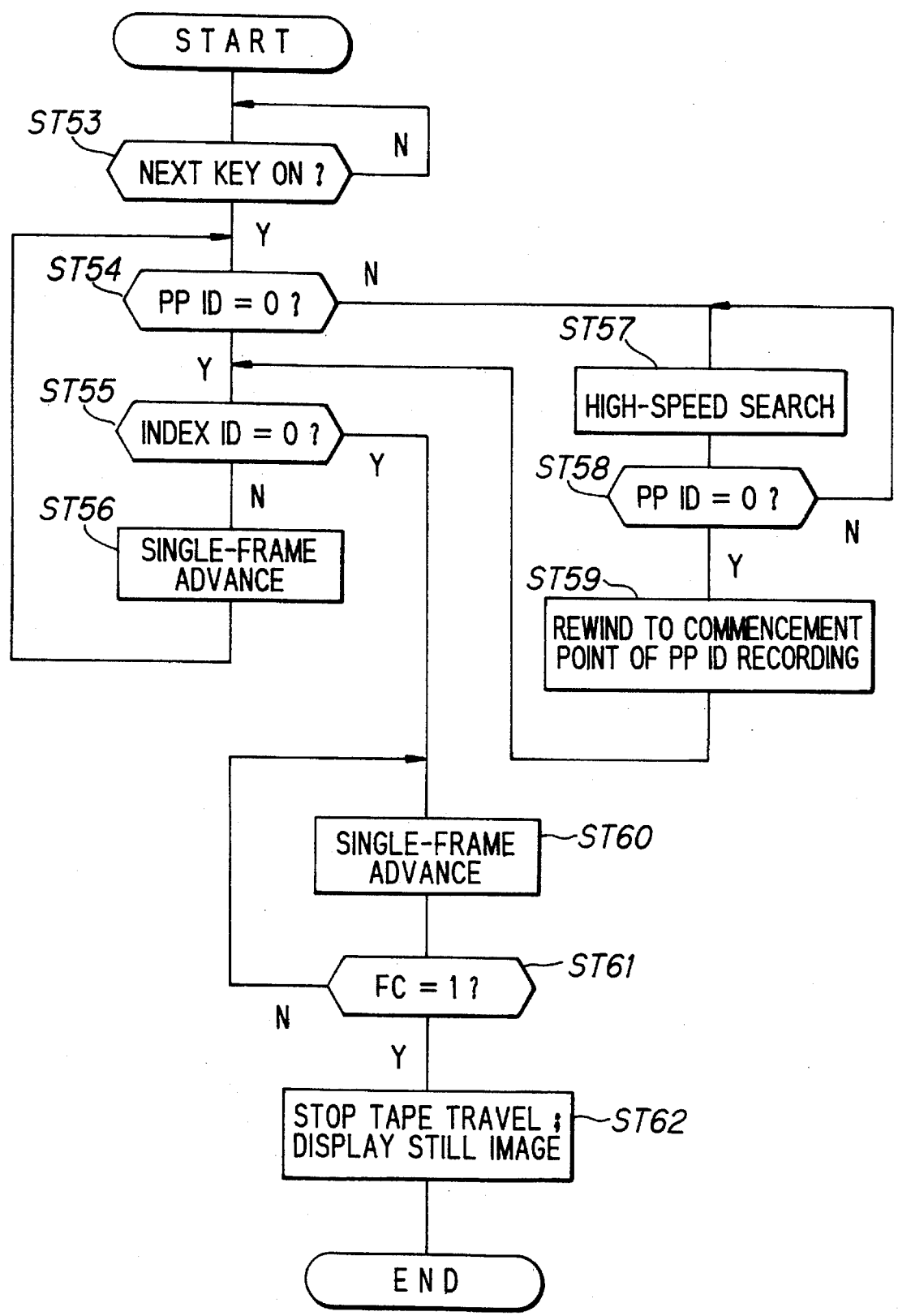
FIG. 39 is a flow chart referred to in explaining the operation of a "next picture" search.

As shown at step ST 53 of FIG. 39, when an instruction to search a next still picture is issued by a user through operation of a NEXT key, it is the determined whether a PP ID signal is present at the current position of the tape (ST 54). If the PP ID code signal is present, namely that the current position is a still picture, then the tape is advanced one frame at a time to search for an INDEX ID signal (ST 54 to ST 56). If the INDEX ID signal is detected, the tape is reproduced one frame at a time up to the termination of the still picture recording, whereat the value of the FC code signal changes from "0" to "1" (ST 60 and ST 61), and the still picture is displayed (ST 62).

If a still picture having the INDEX ID signal is not detected in the still picture recording, the next still picture recording portion is searched for at high speed (ST 57 and ST 58). When the next still picture recording portion is located, the tape is rewound to the start of the still picture recording portion (ST 59), and the presence of the INDEX ID searched (ST 54, ST 55 and ST 56).

Figure 40:
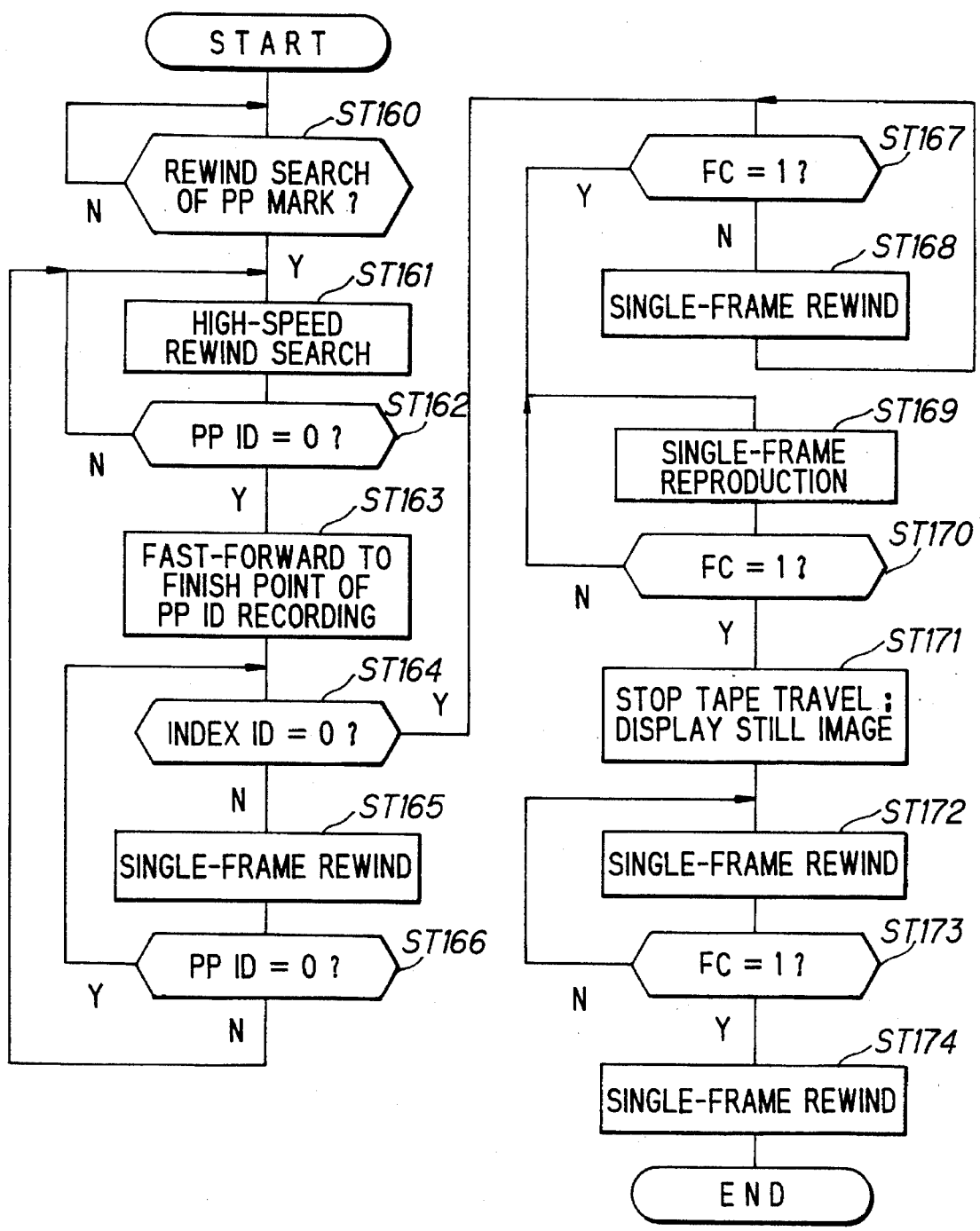
FIG. 40 is a flow chart referred to in explaining the operation of a high speed rewind picture search.

In the above-described example of FIGS. 38 and 39, the still picture search is performed by advancing the tape at high-speed in the forward direction. As shown in FIG. 40, the search may also be carried by high-speed rewinding the tape.

As shown at step ST 160 of FIG. 40, when a still picture search by rewinding is specified, a still picture recording is located while the tape is rewound at high speed (ST 160 to ST 162). After the still picture recording is located, the tape is fast-forwarded up to the end of the still picture recording (ST 163). The still picture recording is searched while the tape is rewound one frame at a time until the INDEX ID signal has a value of "0" (ST 164, ST 165, and ST 166).

If the designated still picture is located, the tape is rewound one frame at a time to return to the start of the still picture recording, at which the value of the FC code signal changes from "0" to "1" (ST 167 and ST 168). Reproduction is executed until the end of the still picture recording (ST 169 and ST 170), whereupon the tape is stopped and the still picture displayed (ST 171).

After the still picture is displayed for a predetermined time, the tape is again rewound to the start of the still picture recording (ST 172 and ST 173). The tape is further rewound by one frame, and the tape is stopped at an image frame that immediately precedes the reproduced still picture recording (ST 174).

The tape is rewound by one frame to permit execution of a NEXT search by rewinding. The operation of a NEXT search by rewinding the tape is shown in FIG. 41.

Figure 41:
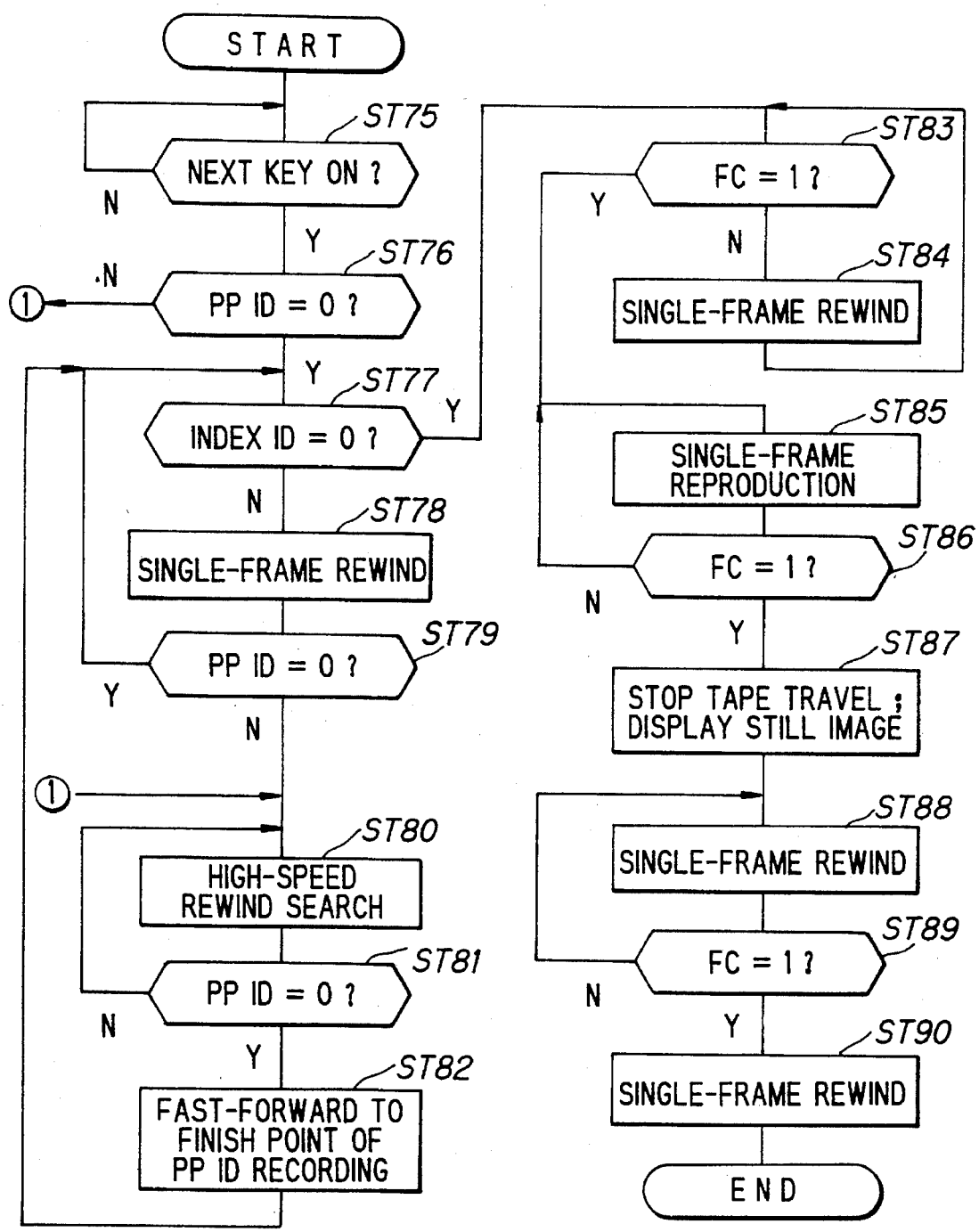
FIG. 41 is a flow chart referred to in explaining the operation of a "next picture" rewind search.

As shown at step ST 75 of FIG. 41, when the NEXT search is requested by the user, it is determined whether the present tape position is within a still picture recording, namely whether PP ID=0 (ST 76). If the tape is so located, the tape is rewound one frame at a time until a still picture after-recorded with an INDEX ID signal is detected (steps ST 77 to ST 79).

If no INDEX ID signal is detected within this still picture recording, the tape is rewound at high speed until the next still picture recording is located (steps ST 80 and ST 81). If a still picture recording is located, the tape is fast-forwarded to the end of the still picture recording and the INDEX ID search shown in steps ST 77 to ST 79 is resumed. After an INDEX ID signal is detected in ST 77, the operation shown in steps ST 83 to ST 90 (which is the same as the operation shown in steps ST 167 to ST 174 in FIG. 40) is executed. The still picture is then displayed.

If, at step ST 76, it is determined that the tape is not located within a still picture recording, the high speed search shown in steps ST 80 and ST 81 is further executed.

The operation of the reproducing circuit shown in FIG. 25 to reproduce and display the designated and searched still pictures is now described with reference to FIG. 42.

Figure 42:
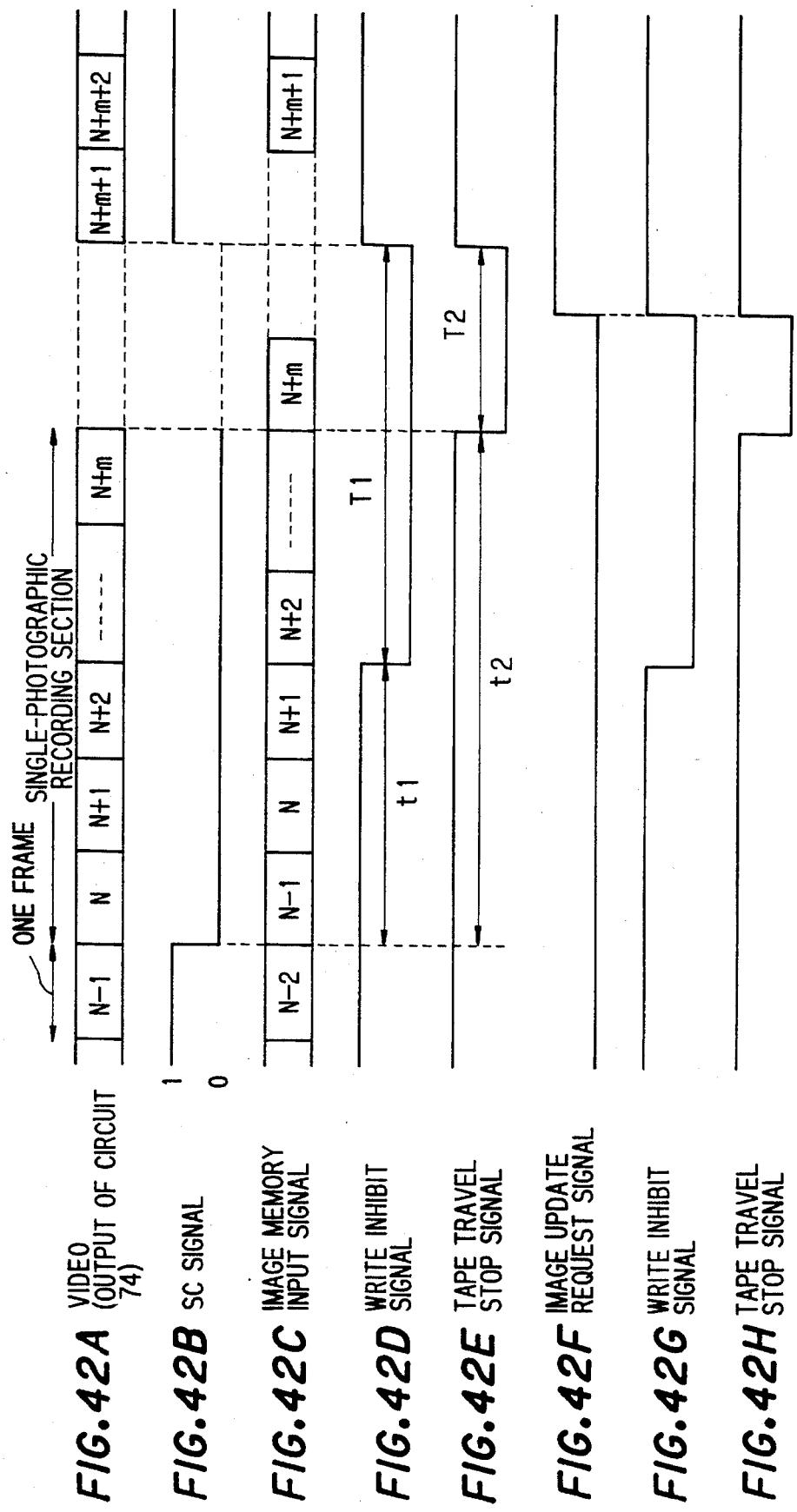
FIG. 42 is a timing diagram of signals generated by the reproducing circuit of FIG. 25.

FIG. 42(1) shows the video signal delivered by the data separating circuit 74 to the image compression decoding circuit 77. The period from frame N to frame N+M in the video signal corresponds to a single-photographic recording image. Corresponding to the video signal, is the VAUX SOURCE CONTROL pack of the accompanying VAUX area supplied by the separating circuit 74, wherein the SC code has the value "0", as shown in FIG. 42(2).

If a time lag caused by the de-shuffling operation of the de-shuffled/de-blocking circuit 78 is one frame, the de-shuffled video data supplied to the image memory 79 is delayed by one frame in respect to the video signal supplied to decoding circuit 77, as shown in FIG. 42(3).

The SC code signal, shown in FIG. 42(2), is delivered by the data decoder 84 to the time limit control circuit 83 which generates a write inhibit signal, shown in FIG. 42(4), as a function of the SC code signal. The control circuit 83 delivers the write inhibit signal to the write-in/read-out control circuit 81 and also delivers a tape travel stop signal, shown in FIG. 42(5), to the tape/head driving system 82. The write-in/read-out controller 81 inhibits the writing of a reproduction image signal into the image memory 79 as a function of the write inhibit signal, shown in FIG. 42(4), during a time period T1 starting from the frame (N+2), shown in FIG. 42(3). The image memory 79, during the T1 time period, repeatedly reads out the (N+1) frames of stored image signals such that the read-out still pictures are displayed.

The tape/head driving system 82 stops tape travel as a function of the tape running stop signal, shown in FIG. 42(5), during a time period T2 which starts from the time of the image signal corresponding to a last frame (N+m) of the single-photographic image recording portion, shown in FIG. 42(1), and ends with the end of the still picture display time period T1. At the end of the still picture display time period T1, the write-in/read-out of memory 79 and the tape travel resume, and moving images are reproduced and displayed from frame (N+m+1).

The length of the still picture display time period T1 is predefined to be several tens of seconds, but this value may be changed by the user. It is desirable that the length of T1 be set so that a frame located near the center of the single-photographic image recording is repeatedly read out from the image memory 79.

The length of the time period T2 is determined by the number of frames in the single-photographic image recording time period zone.

As shown in FIG. 42(4), the still picture is displayed for the time period T1 and thereafter reproduction of the moving image resumes. Alternatively, to resume display of the moving image before the end of the time period T1, a picture screen renewing key located on the reproducing apparatus is activated and delivers an image update request signal, shown in FIG. 42(6), to the time limit control circuit 83. The control circuit 83 forcibly resets the write inhibition signal, as shown in FIG. 42(7), and the tape travel stop signal, as shown in FIG. 42(8), to resume reproduction of the next moving image.

The time limit control circuit 83 is readily constructed using known counters, decoders, etc., and the details thereof are omitted.

Figure 43:
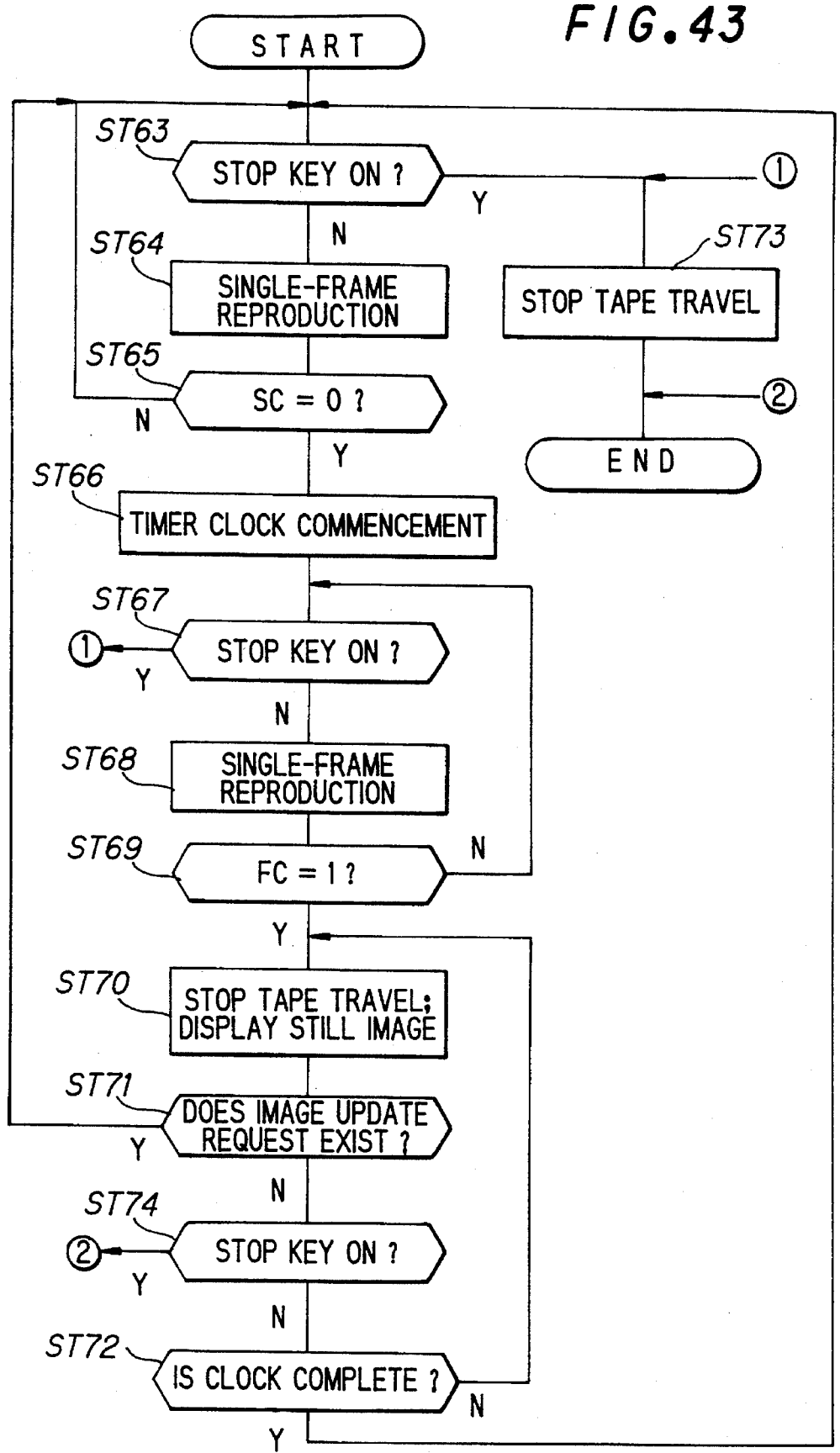
FIG. 43 is a flow chart referred to in explaining the auto-switching operation of the reproduction circuit of FIG. 25.

FIG. 43 illustrates the automatic operation of the reproducer circuit of FIG. 25 to change from the display of the moving image to the display of the single-photographic recording image.

As shown in FIG. 43, a conventional moving image is reproduced frame by frame from a recorded moving image (ST 63 to ST 65) during which the values of the SC code signal is "1". When the single-photographic image recording portion is reached, the value of SC is "0", and a timer in the control circuit 83 which determines the still picture display time period is activated (ST 66). The tape is advanced and the single-photographic image recording is reproduced until the end of the image, whereat the value of the FC flag signal changes to "1" (steps ST 67 through ST 69). When the end of the single-photographic image recording is reached, the tape is stopped until the timer counts the end of the still picture display time. The still picture is repeatedly read-out from the image memory and displayed until the end of the still picture display time (steps ST 70, ST 71, ST 74 and ST 72).

If an image screen renewal request signal is issued by the user while the still picture is displayed, the moving picture is again reproduced (ST 71 and ST 63 through ST 65).

When the still picture display time period is terminated, reproduction of a moving image is also re-started (ST 72).

If the user operates the STOP key during still picture reproduction, tape travel is stopped, and the reproduction operation terminated (ST 63, ST 67, ST 74, and ST 73).

Although a detailed explanation has been given regarding an embodiment in which the image recording apparatus according to the present invention is applied to a digital VTR, the invention is not of course limited to such an embodiment. Namely, if the image recording reproducing apparatus enables after-recording of a plurality of ID signals which may be able to perform the same function as the function performed by the above-mentioned PP ID, INDEX ID, FC, SC, and ST signals, it can also be applied to, for example, an analog VTR. In this case, those skilled in art can make various structural modifications and changes without departing from the spirit and scope of the invention. Also, it is apparent that such an embodiment is not excluded from the scope of the invention.

Further, while the present invention has been particularly shown and described in conjunction with preferred embodiments thereof, it will be readily appreciated by those of ordinary skill in the art that other various changes may also be made without departing from the spirit and scope of the invention.

Therefore, it is intended that the appended claims be interpreted as including the embodiments described herein, the alternatives mentioned above, and all equivalents thereto.

What is claimed is:

1. An apparatus for recording digital video signals in the form of coded signals representing a recording format which includes a video signal recording area for recording video information, representing one of moving picture information and still picture information, and for recording respective accompanying signals and a subcode signal recording area for recording subcode information, said apparatus comprising:

generating means for generating accompanying video signals and subcode signals, said subcode signals including location information for locating a portion of said video information on a recording medium;

framing means for framing digital video signals and said accompanying video signals to form blocks of associated video signals having a first predefined format; and combining means for combining, in a predetermined order, said blocks of associated video signals with said subcode signals to form combined signals such that when said combined signals are recorded in a plurality of tracks on a recording medium, at least a respective portion of said subcode signals is recorded on a first track and at least on a second track.

2. The apparatus of claim 1, further comprising encoding means for encoding said combined signals into said coded signals; and recording means for recording said coded signals onto a recording medium.

3. The apparatus of claim 1, further comprising input terminal means for inputting a composite video signal; analog-to-digital converting means for converting said composite video signal to a digital video signal; data compression means for compressing said digital video signal to form a compressed digital video signal; quantizing means for quantizing said compressed digital video signal to form a quantized digital video signal; variable length coding means for variable length coding means said quantized digital video signal to form a variable length coded video signal and for supplying said variable length coded video signal to said framing means.

4. The apparatus of claim 1, wherein said recording format includes an audio recording area for recording audio information and accompanying audio information; said generating means generates accompanying audio signals; said framing means frames digital audio signals and said accompanying audio signals to form blocks of associated audio signals having a second predefined format; and said combining means combines, in said predetermined order, said blocks of associated audio signals, said blocks of associated video signals and said subcode signals to form said combined signals.

5. The apparatus of claim 4, further comprising input terminal means for inputting a composite video signal and an audio signal; analog-to-digital converting means for converting said composite video signal and said audio signal to a digital video signal and to a digital audio signal; processing means for processing said digital audio signal to form a processed digital audio signal and for supplying said processed audio signal to said framing means.

6. The apparatus of claim 1, wherein said generating means forms packs of said accompanying video signals, said packs being comprised of item data and succeeding data, said item data determining the arrangement and function of said succeeding data.

7. The apparatus of claim 6, wherein said item data formed by said generating means comprises an upper level item and comprising a lower level item, a value of said lower level item defining said function of said succeeding data as a function of a value of said upper level item.

8. The apparatus of claim 1, wherein said generating means generates accompanying video signals which include information indicating whether the video data of a present frame is identical to the video data of an immediately preceding frame.

9. The apparatus of claim 8, wherein said generating means forms packs of said accompanying video signals and at least one of said packs includes said information.

10. The apparatus of claim 1, wherein said generating means generates accompanying video signals which include information indicating whether the video data of a present frame represents said still picture information.

11. The apparatus of claim 10, wherein said generating means forms packs of said accompanying video signals and at least one of said packs includes said information.

12. The apparatus of claim 1, wherein said generating means generates accompanying video signals which include information indicating whether the video data of a present frame represents said still picture information and indicates that said still picture information is reproducible from a reproducing apparatus with tape travel temporarily stopped.

13. The apparatus of claim 12, wherein said generating means forms packs of said accompanying video signals and at least one of said packs includes said information.

14. The apparatus of claim 1, wherein said generating means forms packs of said subcode signals, said packs being comprised of item data and succeeding data, said item data determining the arrangement and function of said succeeding data.

15. The apparatus of claim 14, wherein said item data formed by said generating means comprises an upper level item and comprising a lower level item, a value of said lower level item defining said function of said succeeding data as a function of a value of said upper level item.

16. The apparatus of claim 14, wherein said succeeding data of the packs formed by said generating means comprise one of main data representing data generic to a recording medium and optional data.

17. The apparatus of claim 16, wherein plural packs formed by said generating means are included in a track of said coded signals and at least two of said plural packs that comprise main data are identical.

18. The apparatus of claim 16, wherein plural packs formed by said generating means are included in a track of said coded signals and plural tracks of said coded signals are included in a frame of said coded signals; and the packs that comprise main data in at least a first pair of said plural tracks are identical and the packs that comprise main data in at least a second pair of said plural tracks are identical and differ from the packs of said first pair.

19. The apparatus of claim 16, wherein plural packs formed by said generating means are included in a track of said coded signals and plural tracks of said coded signals are included in a frame of said coded signals; and the packs that comprise optional data in a first one of said plural tracks correspond to the packs that comprise optional data in at least a second one of said plural tracks, and the packs that comprise optional data in a third one of said plural tracks correspond to the packs that comprise optional data in at least a fourth one of said plural tracks and differ from the packs of said first and second ones.

20. The apparatus of claim 14, wherein said generating means includes switching means for arranging a sequence of said packs in a track of said coded signals.

21. The apparatus of claim 1, wherein said combining means generates ancillary subcode signals and combines said ancillary subcode signals with blocks of said subcode signals and with said blocks of associated video signals to form said combined signals.

22. The apparatus of claim 21, wherein said ancillary subcode signals generated by said combining means includes information indicating a period in which said still picture information is recorded on a video tape.

23. The apparatus of claim 21, wherein said ancillary subcode signals generated by said combining means includes said location information for locating a portion of said video information on said recording medium.

24. The apparatus of claim 21, wherein said combining means includes ancillary subcode signal generating means for generating said ancillary subcode signals and synthesizing means for combining said ancillary subcode signals with blocks of said subcode signals.

25. The apparatus of claim 14, wherein plural packs formed by said generating means are included in a track of said coded signals, and said combining means generates ancillary subcode signals and combines said ancillary subcode signals with said plural packs.

26. An apparatus for processing digital video signals in the form of coded signals representing a recording format which includes a video signal recording area for recording video information, representing one of moving picture information and still picture information, and for recording respective accompanying signals and a subcode signal recording area for recording subcode information, said apparatus comprising:

generating means for generating accompanying video signals and subcode signals, said subcode signals including location information for locating a portion of said video information on a recording medium;

framing means for framing digital video signals and said accompanying video signals to form blocks of associated video signals having a first predefined format; and combining means for combining, in a predetermined order, said blocks of associated video signals with said subcode signals to form combined signals such that when said combined signals are recorded in a plurality of tracks on a recording medium, at least a respective portion of said subcode signals is recorded on a first track and at least on a second track.

27. An apparatus for reproducing digital video and audio signals recorded on a record medium in the form of coded signals representing a recording format which includes a video signal recording area for recording video information, representing one of moving picture information and still picture information, and respective accompanying signals and a subcode signal recording area for recording subcode information which includes location information for locating a portion of said video information on said recording medium, said apparatus comprising:

reading means for reading said coded signals from said record medium;

decoding means for decoding said coded signals into combined signals;

first separating means for separating said combined signals into blocks of associated video signals and into subcode signals;

second separating means for separating said blocks of associated video signals into video signals and into accompanying video signals; and control means for controlling operation of said reading means as a function of said accompanying video signals and said subcode signals.

28. The apparatus of claim 27, further comprising storage means for storing said video signals, and wherein said control means controls operation of said storage means as a function of said accompanying video signals and said subcode signals.

29. An apparatus for recording and reproducing digital video signals in the form of coded signals representing a recording format which includes a video signal recording area for recording video information, representing one of moving picture information and still picture information, and for recording respective accompanying signals and a subcode signal recording area for recording subcode information, said apparatus comprising:

generating means for generating accompanying video signals and subcode signals, said subcode signals including location information for locating a portion of said video information on a recording medium;

framing means for framing digital video signals and said accompanying video signals to form blocks of associated video signals having a predefined format;

combining means for combining, in a predetermined order, said blocks of associated video signals with said subcode signals to form combined signals such that when said combined signals are recorded in a plurality of tracks on a recording medium, at least a respective portion of said subcode signals is recorded on first track and at least on a second track;

encoding means for encoding said combined signals into said coded signals;

recording means for recording said coded signals onto a record medium;

reading means for reading said coded signals from said record medium;

decoding means for decoding said coded signals into said combined signals;

first separating means for separating said combined signals into said blocks of associated video signals and into said subcode signals;

second separating means for separating said blocks of associated video signals into said video signals and into said accompanying video signals; and control means for controlling operation of said reading means as a function of said accompanying video signals and said subcode signals.

* * * * *